US012750268B2

(12) United States Patent
Wu et al.

(10) Patent No.: US 12,750,268 B2
(45) Date of Patent: Sep. 29, 2026

(54) DEMODULATION OF MODULATION CONSTELLATIONS WITH PROBABILISTIC AMPLITUDE SHAPING

(71) Applicant: QUALCOMM Incorporated, San Diego, CA (US)

(72) Inventors: Liangming Wu, Beijing (CN); Thomas Joseph Richardson, South Orange, NJ (US); Kexin Xiao, Shanghai (CN); Changlong Xu, Beijing (CN); Ori Shental, Marlboro, NJ (US); Hao Xu, Beijing (CN)

(73) Assignee: Qualcomm Incorporated, San Diego, CA (US)

( * ) Notice: Subject to any disclaimer, the term of this patent is extended or adjusted under 35 U.S.C. 154(b) by 353 days.

(21) Appl. No.: 18/547,682

(22) PCT Filed: Apr. 22, 2021

(86) PCT No.: PCT/CN2021/088932
§ 371 (c)(1),
(2) Date: Aug. 23, 2023

(87) PCT Pub. No.: WO2022/222094
PCT Pub. Date: Oct. 27, 2022

(65) Prior Publication Data

US 2024/0137261 A1 Apr. 25, 2024

(51) Int. Cl.
*H04L 27/34* (2006.01)
*H04L 5/00* (2006.01)

(52) U.S. Cl.
CPC ............ *H04L 27/34* (2013.01); *H04L 5/0053* (2013.01); *H04L 5/0091* (2013.01)

(58) Field of Classification Search
CPC . H04L 25/067; H04L 27/26025; H04L 27/34; H04L 27/3405; H04L 27/36; H04L 5/0053; H04L 5/0091
See application file for complete search history.

(56) References Cited

U.S. PATENT DOCUMENTS

| | | | | |
|---|---|---|---|---|
| 2019/0149390 A1* | 5/2019 | Torbatian | .............. | H04L 27/362 375/298 |
| 2020/0287756 A1* | 9/2020 | Razzetti | ................ | H04L 1/0042 |

(Continued)

FOREIGN PATENT DOCUMENTS

| | | | | |
|---|---|---|---|---|
| CN | 108768602 B * | 4/2020 | ........ | H04W 72/0446 |
| EP | 3706379 A1 | 9/2020 | | |

(Continued)

OTHER PUBLICATIONS

Cho J., et al., "Probabilistic Constellation Shaping for Optical Fiber Communications", Journal of Lightwave Technology, IEEE, USA, vol. 37, No. 6, Mar. 15, 2019 (Mar. 15, 2019), pp. 1590-1607, XP011717096, ISSN: 0733-8724, DOI: 10.1109/JLT.2019.2898855, [retrieved on Mar. 29, 2019] p. 1601, abstract, Section 1, 2, 3.

(Continued)

*Primary Examiner* — Derrick V Rose
(74) *Attorney, Agent, or Firm* — Holland & Hart LLP

(57) ABSTRACT

Methods, systems, and devices for wireless communications are described in which a receiving device, such as a base station or user equipment (UE), may receive an input signal that is modulated according to a probabilistic amplitude shaping (PAS) modulation technique. The receiving device may determine an associated channel noise estimate and may scale the input signal and the channel noise estimate based on a probability distribution parameter that is associated with the PAS modulation. The receiving device may demap the modulation constellation of the input signal based (Continued)

on the scaled input signal and the scaled channel noise estimate and provide one or more bits associated with the PAS modulated constellation. The probability distribution parameter may be estimated at the receiving device, or the transmitting device may provide the probability distribution parameter to the receiving device.

30 Claims, 17 Drawing Sheets

(56) References Cited

U.S. PATENT DOCUMENTS

| | | | | |
|---|---|---|---|---|
| 2020/0382139 | A1* | 12/2020 | Yoffe | H04L 27/3405 |
| 2021/0194596 | A1* | 6/2021 | Kim | H04B 10/6932 |
| 2021/0367654 | A1* | 11/2021 | Goutay | G06N 3/09 |

FOREIGN PATENT DOCUMENTS

| | | | | |
|---|---|---|---|---|
| GB | 2531367 | A | 3/2010 | |
| WO | WO-2019015742 | A1 * | 1/2019 | H04L 1/0042 |

OTHER PUBLICATIONS

International Search Report and Written Opinion—PCT/CN2021/088932—ISA/EPO—Dec. 9, 2021.

Xing C.J., et al., “Performance Comparison of Probabilistically Shaped QAM Formats and Hybrid Shaped APSK Formats with Coded Modulation”, Journal of Lightwave Technology, IEEE, USA, vol. 38, No. 12, Mar. 13, 2020 (Mar. 13, 2020), pp. 3280-3288, XP011792105, ISSN: 0733-8724, 001: 10.1109/JLT.2020.2980449. [Retrieved on Jun. 8, 2020] Sections I-III.

* cited by examiner

DEMODULATION OF MODULATION CONSTELLATIONS WITH PROBABILISTIC AMPLITUDE SHAPING

CROSS REFERENCE

The present Application is a 371 national stage filing of International PCT Application No. PCT/CN2021/088932 by W U et al. entitled "DEMODULATION OF MODULATION CONSTELLATIONS WITH PROBABILISTIC AMPLITUDE SHAPING," filed Apr. 22, 2021, which is assigned to the assignee hereof, and which is expressly incorporated by reference in its entirety herein.

FIELD OF TECHNOLOGY

The following relates to wireless communications, including demodulation of modulation constellations with probabilistic amplitude shaping.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Information transmitted between network nodes may be modulated by a transmitting device (e.g., a base station or UE) according modulation techniques that provide a modulation constellation, in which each point in the constellation represents one or more bits. A receiving device (e.g., a base station or UE) may attempt to receive the transmitted information by demodulating the transmitted constellation, determining the constellation symbols and associated bit values, and decoding the resultant bit values. Efficient techniques for modulating and demodulating constellations may help to enhance capacity and reliability of wireless communications.

SUMMARY

The described techniques relate to improved methods, systems, devices, and apparatuses that support demodulation of modulation constellations with probabilistic amplitude shaping. In accordance with various aspects, described techniques provide for transmitting a signal from a transmitting device (e.g., a base station or UE) using probabilistic amplitude shaping that is applied to a modulation constellation. A receiving device (e.g., a base station or UE) may receive the signal as an input signal and may determine an associated channel noise estimate. The receiving device may scale the input signal and the channel noise estimate based on a probability distribution parameter that is associated with the probabilistic amplitude shaping, and demap the modulation constellation of the input signal based on the scaled input signal and the scaled channel noise estimate. In some cases, the probability distribution parameter may be estimated at the receiving device (e.g., as a value that provides a divergence between a target distribution and an approximated distribution of the input signal that is a minimum or less than a threshold value). In other cases, the transmitting device may provide the probability distribution parameter to the receiving device. In some cases, demapping at the receiving device may use a same demapper that is used for receiving uniform modulation constellations.

A method for wireless communication at a user equipment (UE) is described. The method may include receiving an input signal from a transmitter on a wireless resource, estimating a channel noise between the UE and the transmitter associated with the wireless resource to determine a channel noise estimate, scaling the input signal and the channel noise estimate to generate a scaled input signal and a scaled channel noise estimate, where the scaling is based on a probability distribution parameter that is associated with a probabilistic amplitude shaping that is applied at the transmitter to a modulation constellation of the input signal, and demapping the modulation constellation of the input signal based on the scaled input signal and the scaled channel noise estimate.

An apparatus for wireless communication at a UE is described. The apparatus may include a processor, memory coupled with the processor, and instructions stored in the memory. The instructions may be executable by the processor to cause the apparatus to receive an input signal from a transmitter on a wireless resource, estimate a channel noise between the UE and the transmitter associated with the wireless resource to determine a channel noise estimate, scale the input signal and the channel noise estimate to generate a scaled input signal and a scaled channel noise estimate, where the scaling is based on a probability distribution parameter that is associated with a probabilistic amplitude shaping that is applied at the transmitter to a modulation constellation of the input signal, and demap the modulation constellation of the input signal based on the scaled input signal and the scaled channel noise estimate.

Another apparatus for wireless communication at a UE is described. The apparatus may include means for receiving an input signal from a transmitter on a wireless resource, means for estimating a channel noise between the UE and the transmitter associated with the wireless resource to determine a channel noise estimate, means for scaling the input signal and the channel noise estimate to generate a scaled input signal and a scaled channel noise estimate, where the scaling is based on a probability distribution parameter that is associated with a probabilistic amplitude shaping that is applied at the transmitter to a modulation constellation of the input signal, and means for demapping the modulation constellation of the input signal based on the scaled input signal and the scaled channel noise estimate.

A non-transitory computer-readable medium storing code for wireless communication at a UE is described. The code may include instructions executable by a processor to receive an input signal from a transmitter on a wireless resource, estimate a channel noise between the UE and the transmitter associated with the wireless resource to determine a channel noise estimate, scale the input signal and the channel noise estimate to generate a scaled input signal and a scaled channel noise estimate, where the scaling is based on a probability distribution parameter that is associated with a probabilistic amplitude shaping that is applied at the transmitter to a modulation constellation of the input signal, and demap the modulation constellation of the input signal based on the scaled input signal and the scaled channel noise estimate.

In some examples of the method, apparatuses, and non-transitory computer-readable medium described herein, the scaling may include operations, features, means, or instructions for identifying a probability distribution indicator that is associated with a probability distribution of the modulation constellation of the input signal, determining a scaling factor for the input signal and the channel noise estimate based on the probability distribution indicator, and scaling the input signal and the channel noise estimate based on the scaling factor. In some examples of the method, apparatuses, and non-transitory computer-readable medium described herein, the scaling factor may be a normalized value that is based on the probability distribution indicator and applied to each of the input signal and the channel noise estimate, and the scaled input signal and the scaled channel noise estimate are provided as inputs to a demapper. In some examples of the method, apparatuses, and non-transitory computer-readable medium described herein, the demapper may be a maximum logarithm (Max-Log) detector that provides a log likelihood ratio (LLR) output to a decoder, and may be a same demapper as used for a non-probabilistic amplitude shaped modulation constellation.

In some examples of the method, apparatuses, and non-transitory computer-readable medium described herein, the scaling is based on a probability distribution indicator that provides an estimated divergence between a target distribution and an approximated distribution of the input signal, where the estimated divergence may be less than a threshold value. In some examples of the method, apparatuses, and non-transitory computer-readable medium described herein, the probability distribution indicator may be calculated at the UE as a parameter that provides a minimum Kullback-Leibler divergence between an approximated Maxwell-Boltzmann distribution of the input signal and the target distribution.

In some examples of the method, apparatuses, and non-transitory computer-readable medium described herein, the scaling may be based on a probability distribution indicator that is provided by the transmitter. In some examples of the method, apparatuses, and non-transitory computer-readable medium described herein, the probability distribution indicator may be received in a medium access control (MAC) control element, in a downlink control information (DCI) communication from the transmitter, in radio resource control (RRC) signaling, or any combinations thereof.

In some examples of the method, apparatuses, and non-transitory computer-readable medium described herein, the modulation constellation is a uniform quadrature amplitude modulation (QAM) constellation with a non-equal probability of constellation symbol locations. In some examples of the method, apparatuses, and non-transitory computer-readable medium described herein, the modulation constellation is a uniform QAM constellation with an equal probability of constellation symbol locations.

A method for wireless communication at a base station is described. The method may include determining a probabilistic amplitude shaping for a modulation constellation of a signal to be transmitted to a UE, transmitting, to the UE, a probability distribution indicator that is associated with the probabilistic amplitude shaping, modulating the signal to be transmitted to the UE using the probabilistic amplitude shaping to generate a shaped modulation constellation, and transmitting the shaped modulation constellation to the UE.

An apparatus for wireless communication at a base station is described. The apparatus may include a processor, memory coupled with the processor, and instructions stored in the memory. The instructions may be executable by the processor to cause the apparatus to determine a probabilistic amplitude shaping for a modulation constellation of a signal to be transmitted to a UE, transmit, to the UE, a probability distribution indicator that is associated with the probabilistic amplitude shaping, modulate the signal to be transmitted to the UE using the probabilistic amplitude shaping to generate a shaped modulation constellation, and transmit the shaped modulation constellation to the UE.

Another apparatus for wireless communication at a base station is described. The apparatus may include means for determining a probabilistic amplitude shaping for a modulation constellation of a signal to be transmitted to a UE, means for transmitting, to the UE, a probability distribution indicator that is associated with the probabilistic amplitude shaping, means for modulating the signal to be transmitted to the UE using the probabilistic amplitude shaping to generate a shaped modulation constellation, and means for transmitting the shaped modulation constellation to the UE.

A non-transitory computer-readable medium storing code for wireless communication at a base station is described. The code may include instructions executable by a processor to determine a probabilistic amplitude shaping for a modulation constellation of a signal to be transmitted to a UE, transmit, to the UE, a probability distribution indicator that is associated with the probabilistic amplitude shaping, modulate the signal to be transmitted to the UE using the probabilistic amplitude shaping to generate a shaped modulation constellation, and transmit the shaped modulation constellation to the UE.

In some examples of the method, apparatuses, and non-transitory computer-readable medium described herein, the probability distribution indicator provides an estimated divergence between a target distribution and an approximated distribution of the shaped modulation constellation. In some examples of the method, apparatuses, and non-transitory computer-readable medium described herein, the probability distribution indicator may be calculated as a parameter that provides a minimum Kullback-Leibler divergence between an approximated Maxwell-Boltzmann distribution of the shaped modulation constellation and the target distribution. In some examples of the method, apparatuses, and non-transitory computer-readable medium described herein, the probability distribution indicator may be transmitted in a MAC control element, in a DCI communication to the UE, in RRC signaling, or any combinations thereof.

In some examples of the method, apparatuses, and non-transitory computer-readable medium described herein, the shaped modulation constellation is a uniform QAM constellation with a non-equal probability of constellation symbol locations. In some examples of the method, apparatuses, and non-transitory computer-readable medium described herein, the shaped modulation constellation is a uniform QAM constellation with an equal probability of constellation symbol locations.

DETAILED DESCRIPTION

Figure 1:
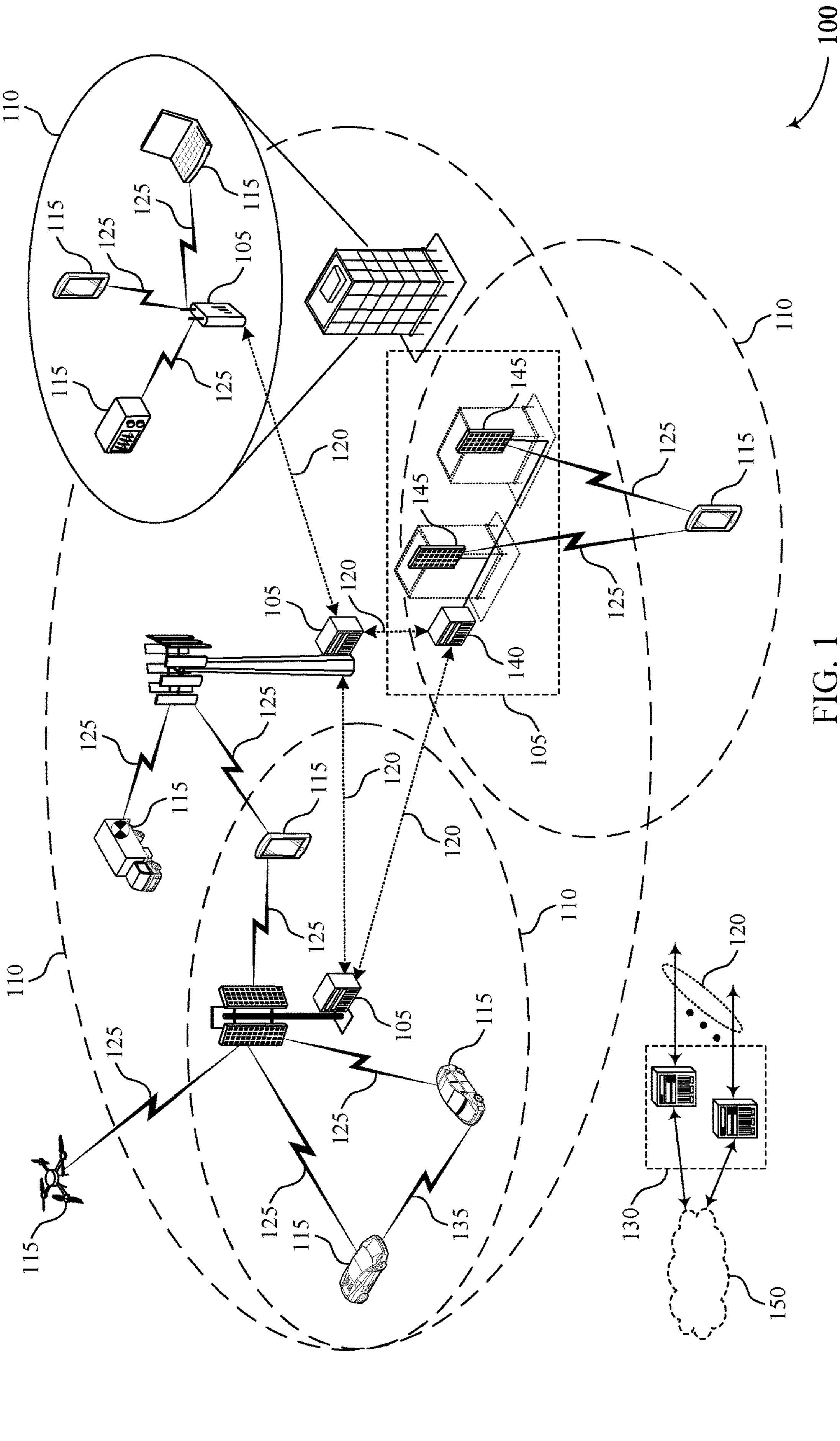
FIG. 1 illustrates an example of a wireless communications system that supports demodulation of modulation constellations with probabilistic amplitude shaping in accordance with aspects of the present disclosure.

In some wireless communications systems, a wireless device (e.g., a user equipment (UE), a base station, or both) may use probabilistic amplitude shaping (PAS), which may also be referred to as probabilistic constellation shaping (PCS), to modulate a signal. For PCS, a transmitting device (e.g., a base station or UE) may use a set of non-uniformly distributed bits for amplitude mapping during modulation of a transmission to a receiving device (e.g., a base station or UE). Using such non-uniformly distributed modulation constellations may provide for increased channel throughput relative to uniformly distributed modulation constellations (e.g., a uniform quadrature amplitude multiplexing (QAM) constellation), and may be referred to as constellation shaping. PCS techniques may provide uniform QAM with non-equal probability of a constellation. Other constellation shaping techniques may include geometric constellation shaping which provide an equal probability constellation with Gaussian amplitude distribution.

In some cases, wireless devices (e.g., UEs, base stations, or both) may not have capability for demapping constellations that are mapped using PAS. For example, existing demapper designs for UEs may assume uniform constellation mapping, and transmissions using PAS may not benefit UEs or other wireless device with demappers based on uniform constellation mapping (e.g., a maximum logarithm (Max-Log) detector that provides a log likelihood ratio (LLR) output to a decoder). In accordance with various aspects discussed herein, input signals to a demapper may be scaled in order to overlay PAS on existing receiving device hardware, allowing for demapping of PAS shaped constellations without having to replace current demodulators for uniform constellations. Such techniques may provide performance enhancements associated with PCS/PAS while using existing hardware designs. In some cases, scaling of demapper inputs may be used with current maximum a posteriori (MAP) or Max-Log detectors where the priori distribution of the input constellations follows Maxwell-Boltzmann (M-B) distributions. For constant composition distribution matcher (CCDM), a parameter 'v' is needed to control the M-B distribution. Various aspects of the present disclosure provide a PAS demapper with a general probability distribution by deriving an optimal or acceptable M-B distribution parameter to approximate the target distribution and scaling demapper inputs based on the derived M-B distribution parameter.

Wireless devices (e.g., UEs and base stations) using constellation shaping may utilize the techniques described herein to experience power saving, such as reduced power consumption and extended battery life while providing reliable and efficient communications. Particular aspects of the subject matter described in this disclosure may be implemented to realize one or more of the following potential advantages. The techniques employed by the described devices may provide benefits and enhancements to the operation of the devices. For example, operations performed by the devices may provide improvements to reliability and throughput of wireless communications. The described techniques may also provide features for improvements to power consumption, spectral efficiency, higher data rates and, in some examples, may promote enhanced efficiency for high reliability and low latency operations, among other benefits.

Aspects of the disclosure are initially described in the context of wireless communications systems. Aspects of the disclosure are further illustrated by and described with reference to demapper architectures, process flows, apparatus diagrams, system diagrams, and flowcharts that relate to demodulation of modulation constellations with probabilistic amplitude shaping.

FIG. 1 illustrates an example of a wireless communications system 100 that supports demodulation of modulation constellations with probabilistic amplitude shaping in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the “device” may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term “carrier” may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $$T_s = 1/(\Delta f_{max} \cdot N_f)$$

seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some wireless communications systems 100, a wireless device (e.g., a UE 115, a base station 105) may use PAS/PCS to modulate a signal. A receiving device (e.g., a base station 105 or UE 115) may receive the signal as an input signal and may determine an associated channel noise estimate. The receiving device may scale the input signal and the channel noise estimate based on a probability distribution parameter that is associated with the PAS, and demap the modulation constellation of the input signal based on the scaled input signal and the scaled channel noise estimate. In some cases, the probability distribution parameter may be estimated at the receiving device (e.g., as a value that provides a divergence between a target distribution and an approximated distribution of the input signal that is a minimum or less than a threshold value). In other cases, the transmitting device may provide the probability distribution parameter to the receiving device. In some cases, demapping at the receiving device may use a same demapper that is used for receiving uniform modulation constellations.

Figure 2:
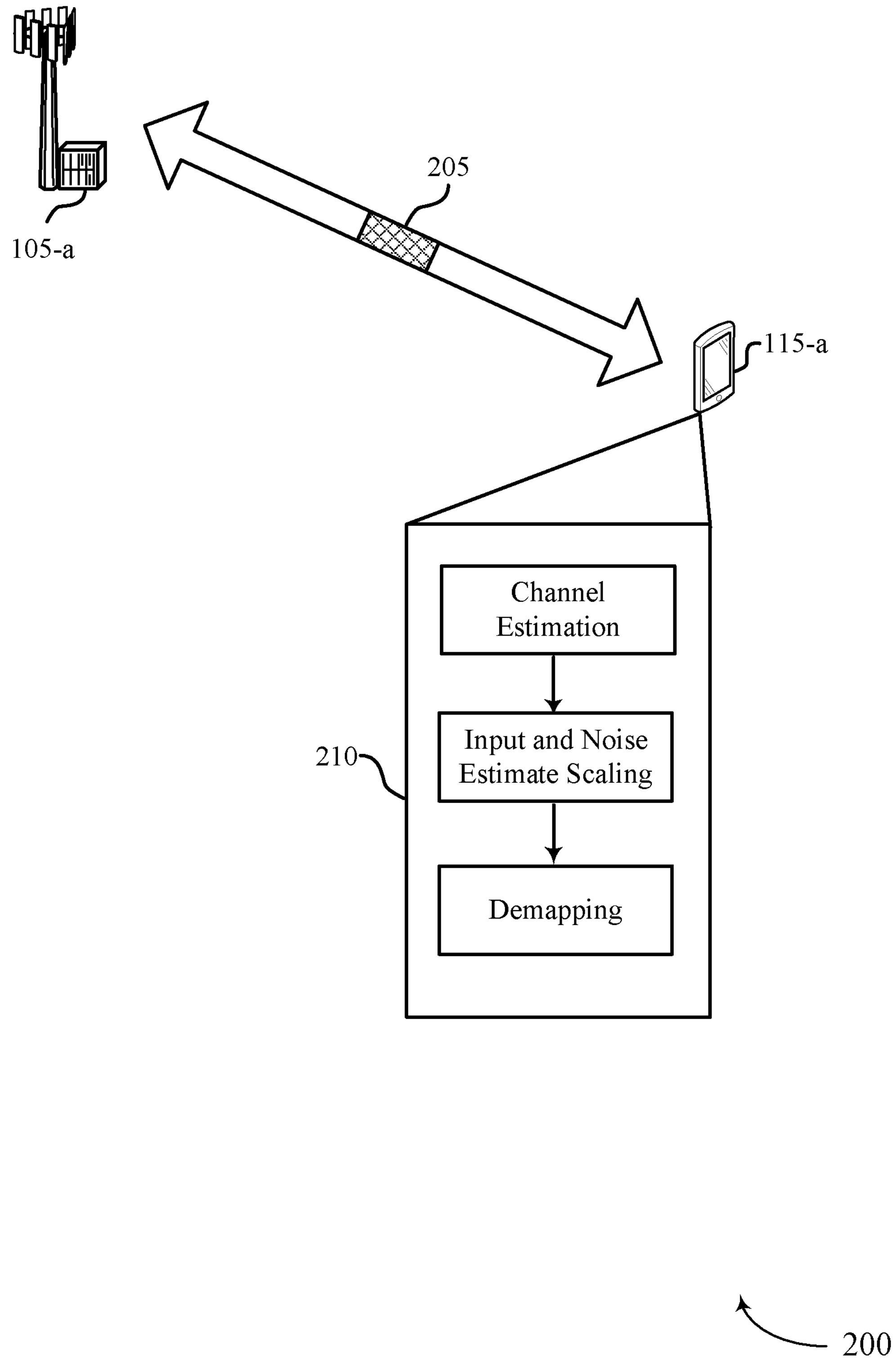
FIG. 2 illustrates an example of a portion of a wireless communications system that supports demodulation of modulation constellations with probabilistic amplitude shaping in accordance with aspects of the present disclosure.

FIG. 2 illustrates an example of a wireless communications system 200 that supports demodulation of modulation constellations with probabilistic amplitude shaping in accordance with aspects of the present disclosure. The wireless communications system 200 may be an example of a wireless communications system 100 as described with reference to FIG. 1. For example, the wireless communications system 200 may include a UE 115-*a* and a base station 105-*a*, which may be examples of the corresponding devices described with reference to FIG. 1.

In some examples, a wireless device (e.g., a UE 115-*a* or a base station 105-*a*) may perform constellation shaping for a quadrature amplitude modulation (QAM) transmission. The wireless device may approach the Shannon capacity for a channel by using non-uniformly distributed symbols (e.g., as opposed to using uniformly distributed symbols, which may be approximately 1.53 decibels (dB) below the Shannon capacity). In some cases, the wireless device may use a Gaussian distribution of constellation symbols for improved performance, such as geometric constellation shaping (GCS) or PAS/PCS. GCS may involve an equal probability constellation with a Gaussian amplitude distribution. PAS may involve a uniform QAM constellation with non-equal probabilities for points in the constellation. Using PAS for QAM transmissions may effectively improve channel throughput (e.g., for an uplink channel, a downlink channel, or both).

To transmit information 205, a wireless device may generate a set of source bits representing the information. To support PAS for a signal transmission a receiving device, such as UE 115-*a*, that receives information 205 that is transmitted with a non-uniform distribution for amplitude mapping may demap received signals using a same demapper that may be used for receiving non-PAS transmissions. In some cases, the UE 115-*a* may include components 210 that perform a channel estimation of a channel associated with the received signal to determine a noise estimate, and scale the received signal and noise estimate based on a probability distribution parameter. The scaled signal and noise estimate may be provided to a demapper that may determine one or more bits associated with the modulation constellation. Transmitting the information 205 using PAS may support a significant shaping gain due to the non-uniform amplitude mapping, thereby enhancing the reliability and throughout of the system.

Figure 3:
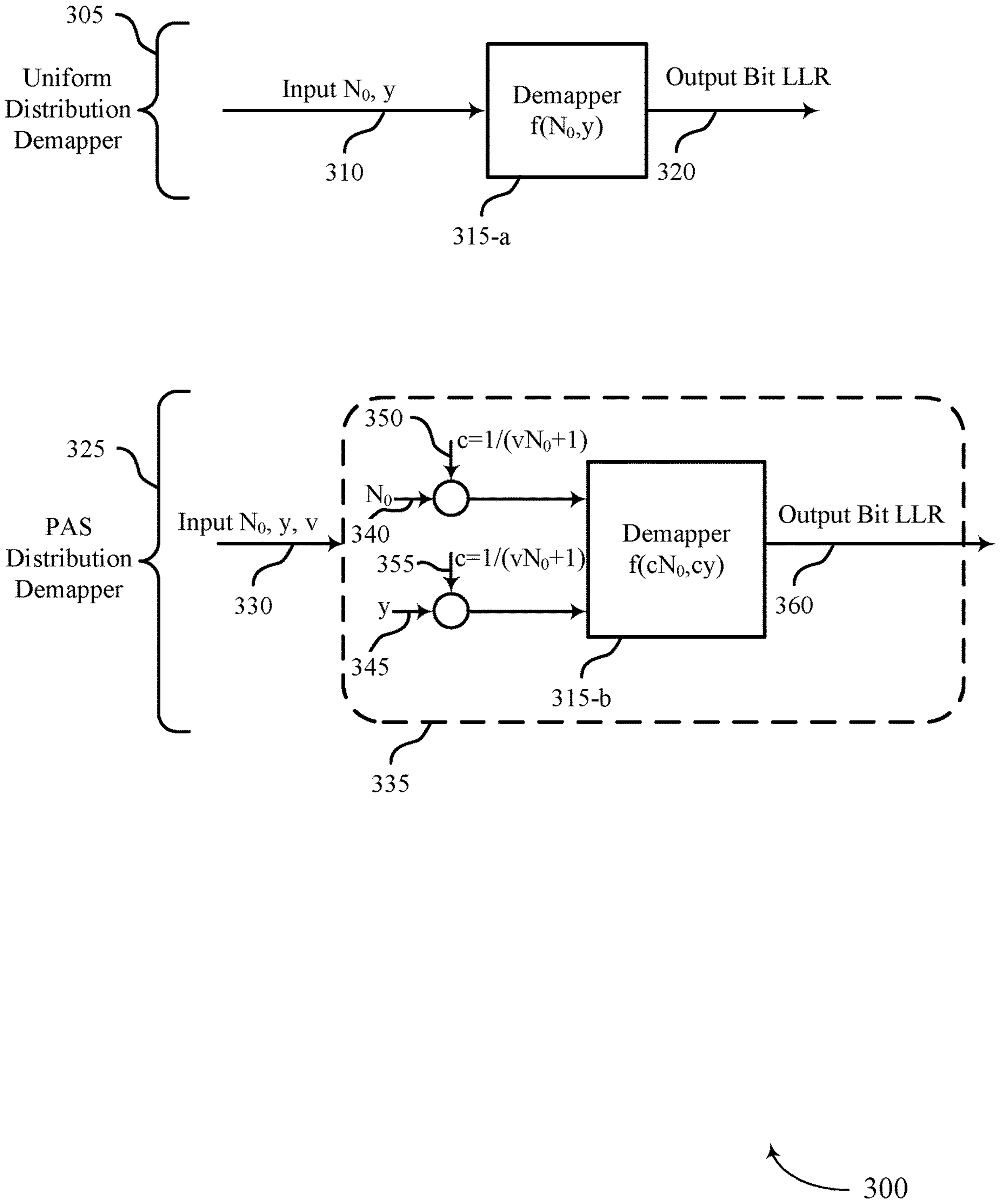
FIG. 3 illustrates examples of uniform and non-uniform distribution demapper components that support demodulation of modulation constellations with probabilistic amplitude shaping in accordance with aspects of the present disclosure.

FIG. 3 illustrates examples of uniform and non-uniform distribution demapper components 300 that support demodulation of modulation constellations with probabilistic amplitude shaping in accordance with aspects of the present disclosure. The uniform and non-uniform distribution demapper components 300 may be implemented by wireless devices, such as UEs 115 or base stations 105, in a wireless communications system 100 or 200, as described with reference to FIGS. 1 and 2.

In a first example, a uniform distribution demapper 305 is illustrated. Such a uniform distribution demapper 305 may receive an input that provides the received input signal (y) and a noise estimate parameter ($N_0$). The equivalent model for the received signal at the receiver, where the channel coefficient has been equalized, may be defined as:

$$y = x + z,$$

where x is the transmitted information carrier component and z is the noise component, where $$z \sim \mathcal{N}(0, N_0/2),$$

and $N_0$ is the estimated noise power spectral density. In the uniform distribution demapper 305, the input signal and noise estimate parameter may be provided to demapper 315-*a*, which outputs an output bit log likelihood ratio (LLR) 320 as a function of the input signal and noise estimate parameter (e.g., $f(N_0,y)$).

In a second example, a PAS distribution demapper 325 may scale one or more input parameters based on a probability distribution indicator "v," which is provided with the input 330 to PAS-based demapper 335. In this example a noise estimate parameter input 340 for $N_0$, an input signal input 345 for received input signal y, may each be scaled based on the probability distribution indicator (v). In this example, the noise estimate parameter input 340 may be scaled by scaling parameter 350 that corresponds to $$c = 1/(vN_0 + 1).$$

Similarly, the received input signal input 345 may be scaled by scaling parameter 355 that corresponds to $$c = 1/(vN_0 + 1).$$

The scaled inputs may be provided to demapper 315-*a*, which outputs an output bit LLR 360 as a function of the scaled input signal and scaled noise estimate parameter (e.g., $f(cN_0,cy)$). In some cases, the demapper 315-*b* may be use the same hardware as demapper 315-*a*, and thus PAS-based constellations may be implemented using a same demapper as non-PAS-based constellations. In some cases, scaling as discussed herein may be used at current MAP detectors as well as at current approximated Max-log detectors.

The input scaling based on the probability distribution indicator may scale the demapper 315-*b* input to account for the PAS constellation. For example, probability distribution indicator 'v' of the M-B distribution may be used to determine the scaling factor (c), where a prior probability for constellation x may be modeled as M-B distributions, according to:

$$Pr(x) = \frac{e^{-vx^2}}{\sum_{\hat{x}\in\mathcal{X}} e^{-v\hat{x}^2}} \propto e^{-vx^2},\ x \in \mathcal{X}.$$

Scaling as discussed herein may provide MAP or LLR outputs based on the PAS constellation. For example, for a uniform distribution:

$$LLR_{Uniform}(i) = \ln\left(\frac{\sum_{x\in\mathcal{X}_{0,i}} Pr(x)p(y \mid x)}{\sum_{\hat{x}\in\mathcal{X}_{1,i}} Pr(\hat{x})p(y \mid \hat{x})}\right)$$

$$= \ln\left(\sum_{x\in\mathcal{X}_{0,i}} \exp\left(-\frac{(y-x)^2}{N_0}\right)\right) -$$

-continued $$\ln\left(\sum_{\hat{x}\in X_{1,i}}\exp\left(-\frac{(y-\hat{x})^2}{N_0}\right)\right)\to f_i^{MAP}(N_0, y)$$

$$\approx \max\left(\left\{-\frac{(y-x)^2}{N_0}\,\middle|\, x\in X_{0,i}\right\}\right)-$$

$$\max\left(\left\{-\frac{(y-\hat{x})^2}{N_0}\,\middle|\,\hat{x}\in X_{1,i}\right\}\right)\to f_i^{MaxLog}(N_0, y)$$

For a PAS distribution, this may correspond to:

$$LLR_{PAS}(i)=\ln\left(\frac{\sum_{x\in X_{0,i}}Pr(x)p(y\mid x)}{\sum_{\hat{x}\in X_{1,i}}Pr(\hat{x})p(y\mid \hat{x})}\right)=$$

$$\ln\left(\frac{\sum_{x\in X_{0,i}}\exp(-vx^2)\exp\left(-\frac{(y-x)^2}{N_0}\right)}{\sum_{\hat{x}\in X_{1,i}}\exp(-v\hat{x}^2)\exp\left(-\frac{(y-\hat{x})^2}{N_0}\right)}\right)$$

$$=\ln\left(\sum_{x\in X_{0,i}}\exp\left(-\frac{(cy-x)^2+(c-c^2)y^2}{cN_0}\right)\right)-$$

$$\ln\left(\sum_{\hat{x}\in X_{1,i}}\exp\left(-\frac{(cy-\hat{x})^2+(c-c^2)y^2}{cN_0}\right)\right)$$

$$=\ln\left(\sum_{x\in X_{0,i}}\exp\left(-\frac{(cy-x)^2}{cN_0}\right)\right)$$

$$-\ln\left(\sum_{\hat{x}\in X_{1,i}}\exp\left(-\frac{(cy-\hat{x})^2}{cN_0}\right)\right)\to f_i^{MAP}(cN_0, cy)$$

$$\approx \max\left(\left\{-\frac{(cy-x)^2}{cN_0}\,\middle|\, x\in X_{0,i}\right\}\right)-$$

$$\max\left(\left\{-\frac{(cy-\hat{x})^2}{cN_0}\,\middle|\,\hat{x}\in X_{1,i}\right\}\right)\to f_i^{MaxLog}(N_0, cy)$$

where $c=\frac{1}{vN_0+1}$.

Figure 4:
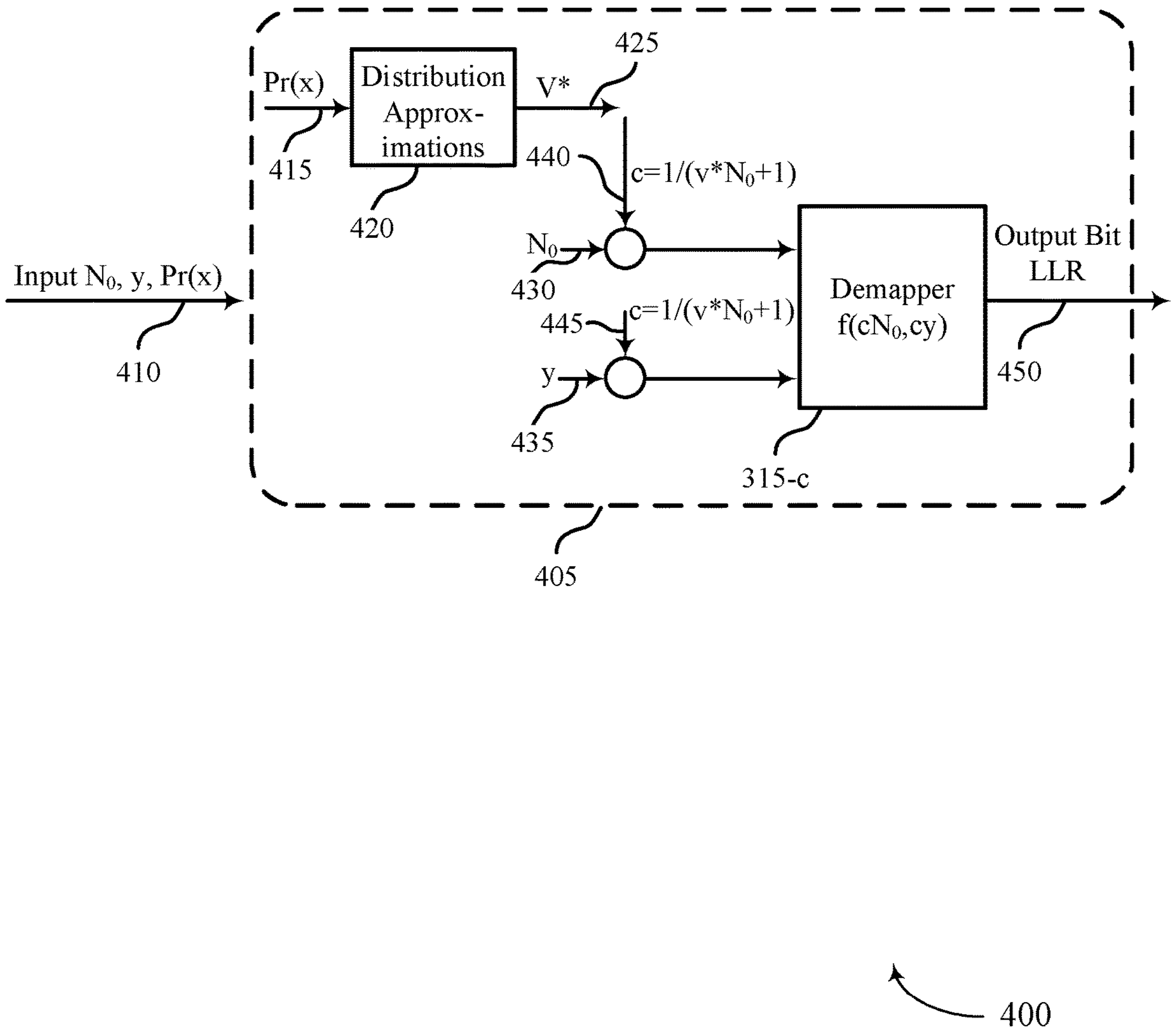
FIGS. 4 and 5 illustrate examples of demapping with scaled inputs that support demodulation of modulation constellations with probabilistic amplitude shaping in accordance with aspects of the present disclosure.

FIG. 4 illustrates an example of a demapper with scaled inputs 400 that supports demodulation of modulation constellations with probabilistic amplitude shaping in accordance with aspects of the present disclosure. The demapper with scaled inputs 400 may be implemented by wireless devices, such as UEs 115 or base stations 105, in a wireless communications system 100 or 200, as described with reference to FIGS. 1 and 2.

In this example, a PAS distribution demapper 405 may scale one or more input parameters based on a constellation probability (Pr(x)), which is provided with a noise estimate parameter ($N_0$) and input signal (y) to input 410 of PAS distribution demapper 405. In this example a noise estimate parameter input 430 for $N_0$, and input signal input 435 for received input signal y, may each be scaled based on the probability (Pr(x)), where the probability is provided as input 415 to a distribution approximation module 420, which outputs a probability distribution indicator v*. In this example, the noise estimate parameter input 430 may be scaled by scaling parameter 440 that corresponds to $$c=1/(vN_0+1).$$

Similarly, the received input signal input 435 may be scaled by scaling parameter 445 that corresponds to $$c=1/(vN_0+1).$$

The scaled inputs may be provided to demapper 315-*c*, which outputs an output bit LLR 450 as a function of the scaled input signal and scaled noise estimate parameter (e.g., f($cN_0$,cy)). In some cases, the demapper 315-*c* may be use the same hardware as demappers 315 of FIG. 3. In some cases, scaling as discussed herein may be used at current MAP detectors as well as at current approximated Max-log detectors.

The estimation of the probability distribution indicator v* may allow PAS in cases with general distributions with a Gaussian shape. In this example, a search for an optimal M-B distribution parameter v* may be performed that provides a minimum value for the Kullback-Leibler (KL) divergence between the target distribution Pr(x) and the approximated M-B distribution Pr(x,v). In this example, the distribution approximation module 420 may be used to search for the optimal or acceptable M-B distribution parameter, such as base on:

$$v^* = \arg\min_v \mathbb{D}(Pr(x)\|Pr(x,v)_{M-B})$$

$$=\arg\min_v\sum_{x\in X}Pr(x)\log_2\left(\frac{Pr(x)}{Pr(x,v)_{M-B}}\right).$$

In this example, the value of v* may be calculated at the receiver. In other cases, as discussed with reference to FIG. 5, the value of v* may be calculated at the transmitter and sent to the receiver. In some cases, if the Pr(x) satisfies the following condition:

$$Pr(x_1)\geq Pr(x_2)\ \text{if}\ x_1^2\leq x_2^2, \qquad (1)$$

then the optimal v* is the solution of the following equation:

$$\sum_{x\in X}\left[\exp(-vx^2)\left(\left(\sum_{\hat{x}\in X}Pr(\hat{x})\hat{x}^2\right)-x^2\right)\right]=0.$$

If (1) is satisfied, then the above equation is monotonically increasing in v and it may be solved efficiently (e.g., using a bisection method) to determine the value of v*. As discussed, in the example of FIG. 4, the receiving device may estimate the value of v*. In other cases, such as illustrated in FIG. 5, the transmitting device may provide the value of v*.

Figure 5:
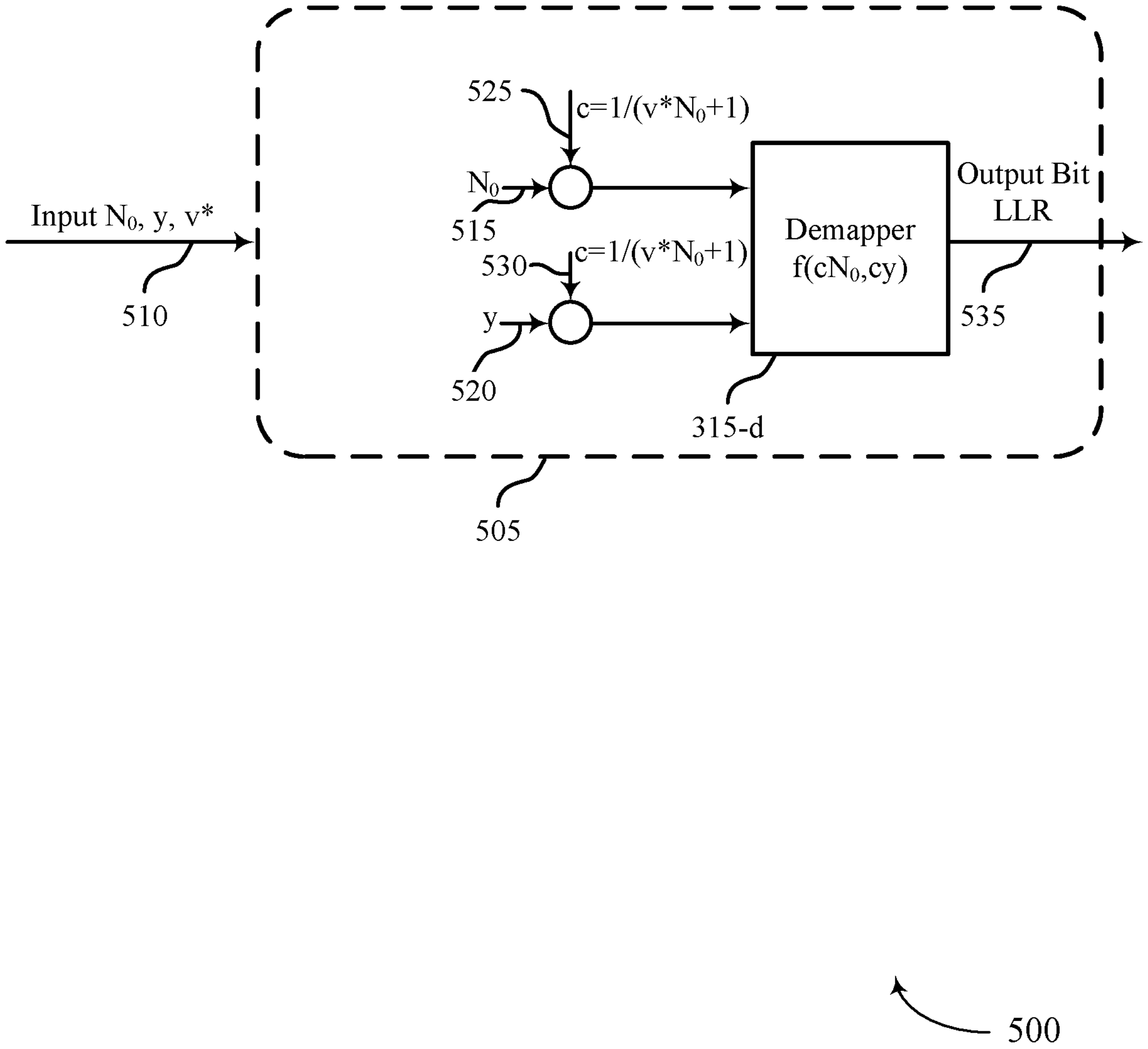

FIG. 5 illustrates an example of a demapper with scaled inputs 500 that supports demodulation of modulation constellations with probabilistic amplitude shaping in accordance with aspects of the present disclosure. The demapper with scaled inputs 500 may be implemented by wireless devices, such as UEs 115 or base stations 105, in a wireless communications system 100 or 200, as described with reference to FIGS. 1 and 2.

In this example, a PAS distribution demapper 505 may scale one or more input parameters based on a probability distribution indicator v* that is provided by the transmitting device, and may be based on a constellation probability (Pr(x)) as discussed with reference to FIG. 4. In this example, the parameter v* is provided with a noise estimate parameter ($N_0$) and input signal (y) to input 510 of PAS distribution demapper 505. In this example a noise estimate parameter input 515 for $N_0$, an input signal input 520 for received input signal y, may each be scaled based on the probability distribution indicator v*. In this example, the noise estimate parameter input 515 may be scaled by scaling parameter 525 that corresponds to $$c = 1/(v*N_0 + 1).$$

Similarly, the received input signal input 520 may be scaled by scaling parameter 530 that corresponds to $$c = 1/(v*N_0 + 1).$$

The scaled inputs may be provided to demapper 315-*d*, which outputs an output bit LLR 535 as a function of the scaled input signal and scaled noise estimate parameter (e.g., f($cN_0$,cy)). In some cases, the demapper 315-*d* may be use the same hardware as demappers 315 of FIGS. 3 and 4. In some cases, scaling as discussed herein may be used at current MAP detectors as well as at current approximated Max-log detectors. In some cases, the value of v* may be provided in a medium access control (MAC) control element (CE), in a downlink control information (DCI) communication from the transmitter, in radio resource control (RRC) signaling, or any combinations thereof.

Figure 6:
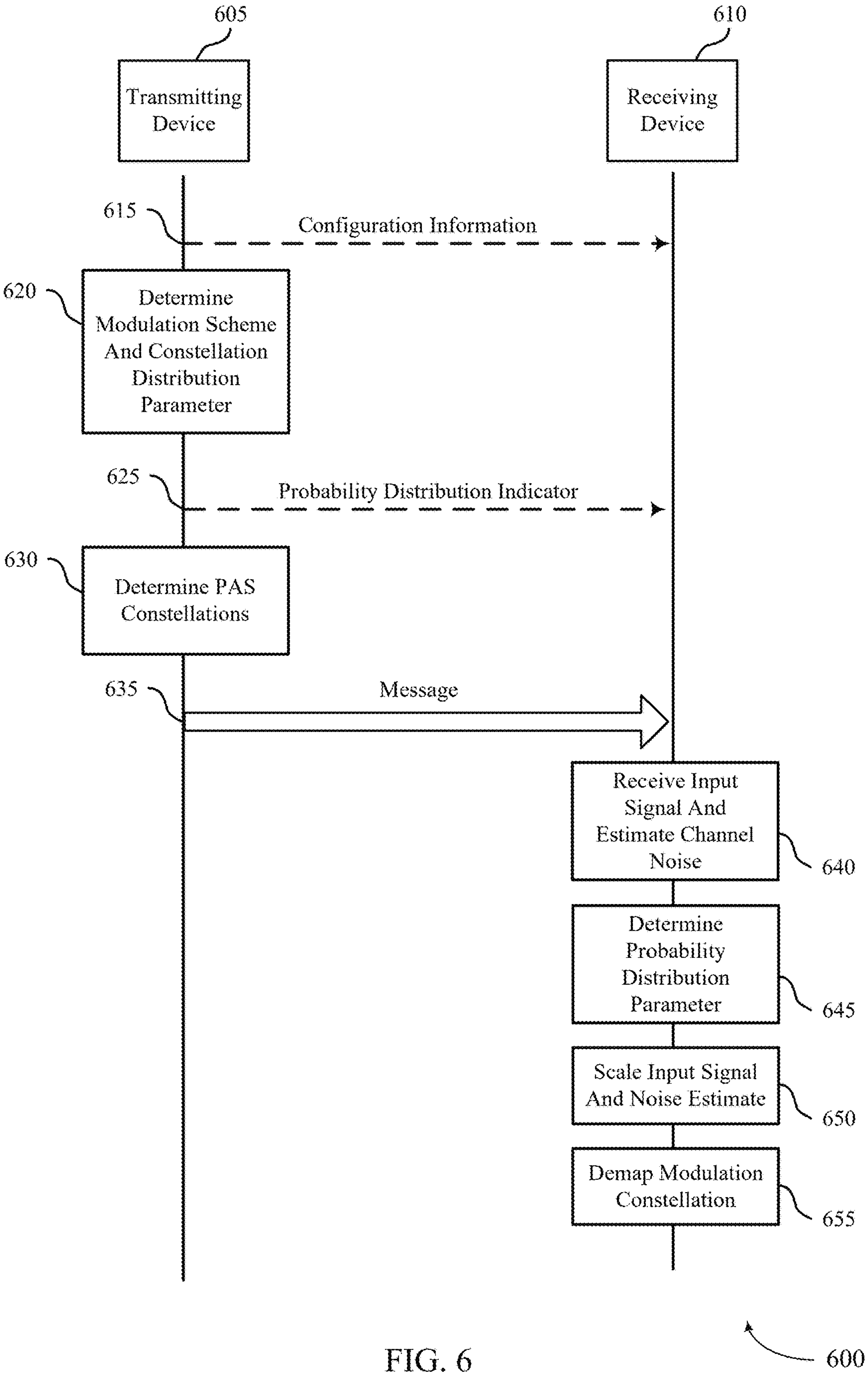
FIG. 6 illustrates an example of a process flow that supports demodulation of modulation constellations with probabilistic amplitude shaping in accordance with aspects of the present disclosure.

FIG. 6 illustrates an example of a process flow 600 that supports demodulation of modulation constellations with probabilistic amplitude shaping in accordance with aspects of the present disclosure. In some examples, the process flow 600 may implement aspects of wireless communications systems 100 or 200. The process flow 600 includes a transmitting device 605 and a receiving device 610, which may be examples of the corresponding devices described with reference to FIGS. 1 through 5. Process flow 600 may be implemented by a transmitting device 605 (such as a base station 105 or a UE 115) and a receiving device 610 (such as a base station 105 or a UE 115). Alternative examples of the following may be implemented, where some operations are performed in a different order than described or are not performed at all. In some cases, operations may include additional features, or further operations may be added.

In some examples, at 615 the transmitting device 605 may send a configuration information message to the receiving device 610. For example, the transmitting device 605 may indicate that PAS is used for modulation of constellation symbols at the transmitting device 605, which may indicate to the receiving device 610 that scaling is to be performed at a demapper, in accordance with techniques as discussed herein.

At 620, the transmitting device 605 may select a modulation scheme and a constellation distribution parameter. For example, the transmitting device 605 may determine a modulation scheme, a constellation distribution parameter, or both for communications with the receiving device 610 as described herein.

Optionally, at 625, the transmitting device 605 may transmit a probability distribution indicator to the receiving device 610. In some cases, the probability distribution indicator may be used for scaling inputs at a demapper at the receiving device 610, as discussed herein.

At 630, the transmitting device 605 may determine PAS constellations. Such constellations may be determined based on PAS/PCS techniques, and may provide a non-uniform distribution of constellations, which may enhance throughput and reliability of communications. At 635, the transmitting device 605 may transmit an information message (e.g., a downlink or uplink transmission) to the receiving device using the determined PAS constellations.

At 640, the receiving device 610 may receive signals from the transmitting device 605 as an input signal and determine an estimate of channel noise. In some cases, the input signal may be provided after initial processing of received signals (e.g., analog reception and amplification, synchronization and OFDM demodulation). In some cases, the input signal and noise estimation may be determined based on channel estimation and equalization at the receiving device 610. At 645, the receiving device 610 may determine a probability distribution parameter. In some cases, the receiving device 610 may determine the probability distribution parameter as a value that is below a threshold, or a minimum value, for the KL divergence between a target distribution and an approximated M-B distribution. In other cases, the receiving device 610 may use a probability distribution parameter that is provided by the transmitting device 605. At 650, the receiving device may scale the input signal and noise estimate, in accordance with techniques as discussed herein. At 655, the receiving device may demap the modulation constellation (e.g., using a Max-log detector that provides output LLR bits).

Figure 7:
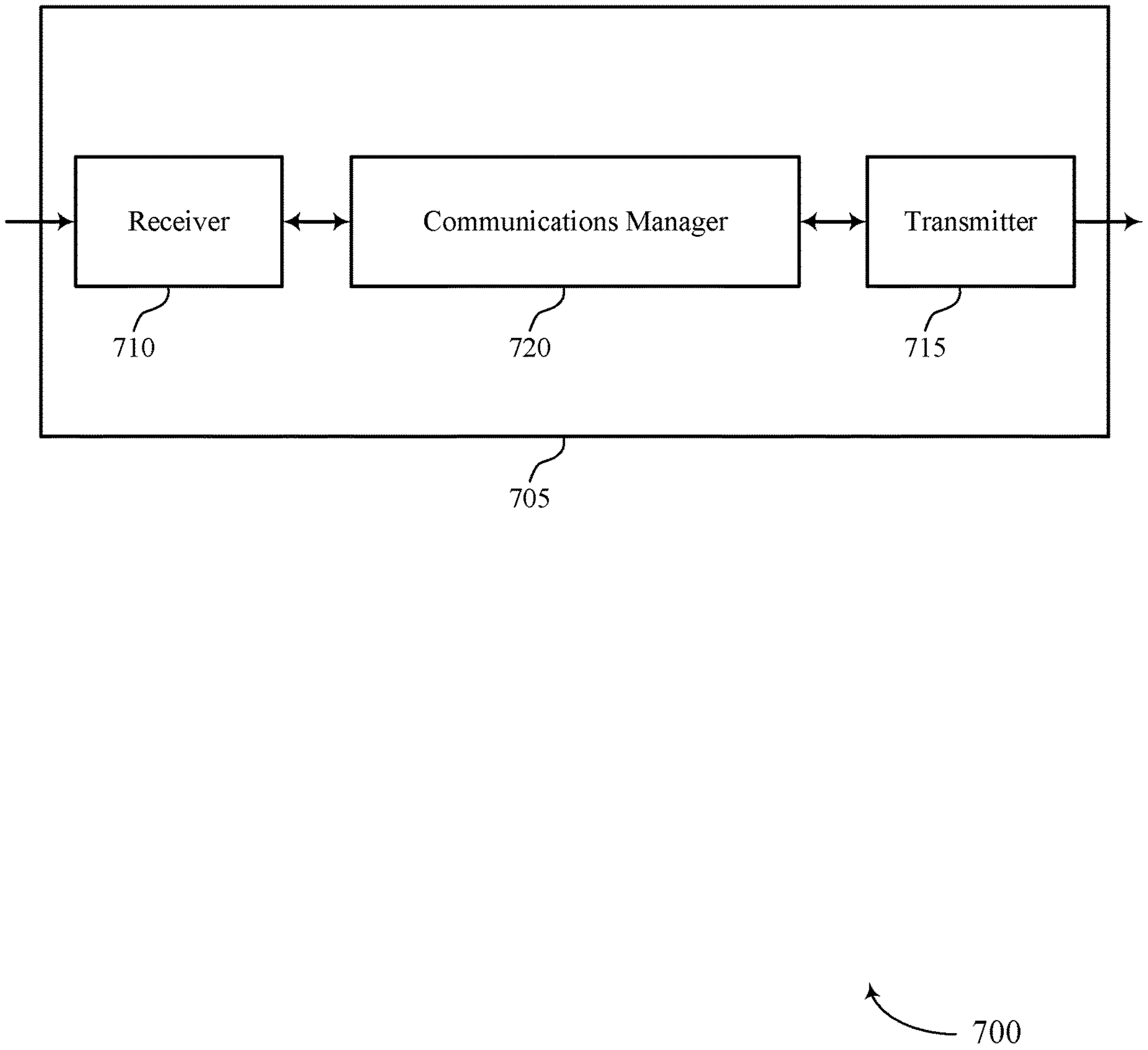
FIGS. 7 and 8 show block diagrams of devices that support demodulation of modulation constellations with probabilistic amplitude shaping in accordance with aspects of the present disclosure.

FIG. 7 shows a block diagram 700 of a device 705 that supports demodulation of modulation constellations with probabilistic amplitude shaping in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to demodulation of modulation constellations with probabilistic amplitude shaping). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to demodulation of modulation constellations with probabilistic amplitude shaping). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of demodulation of modulation constellations with probabilistic amplitude shaping as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. For example, the communications manager 720 may be configured as or otherwise support a means for receiving an input signal from a transmitter on a wireless resource. The communications manager 720 may be configured as or otherwise support a means for estimating a channel noise between the UE and the transmitter associated with the wireless resource to determine a channel noise estimate. The communications manager 720 may be configured as or otherwise support a means for scaling the input signal and the channel noise estimate to generate a scaled input signal and a scaled channel noise estimate, where the scaling is based on a probability distribution parameter that is associated with a probabilistic amplitude shaping that is applied at the transmitter to a modulation constellation of the input signal. The communications manager 720 may be configured as or otherwise support a means for demapping the modulation constellation of the input signal based on the scaled input signal and the scaled channel noise estimate.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for demodulation of PAS modulation constellations that provide improvements to power consumption, spectral efficiency, higher data rates and, more efficient utilization of communication resources.

Figure 8:
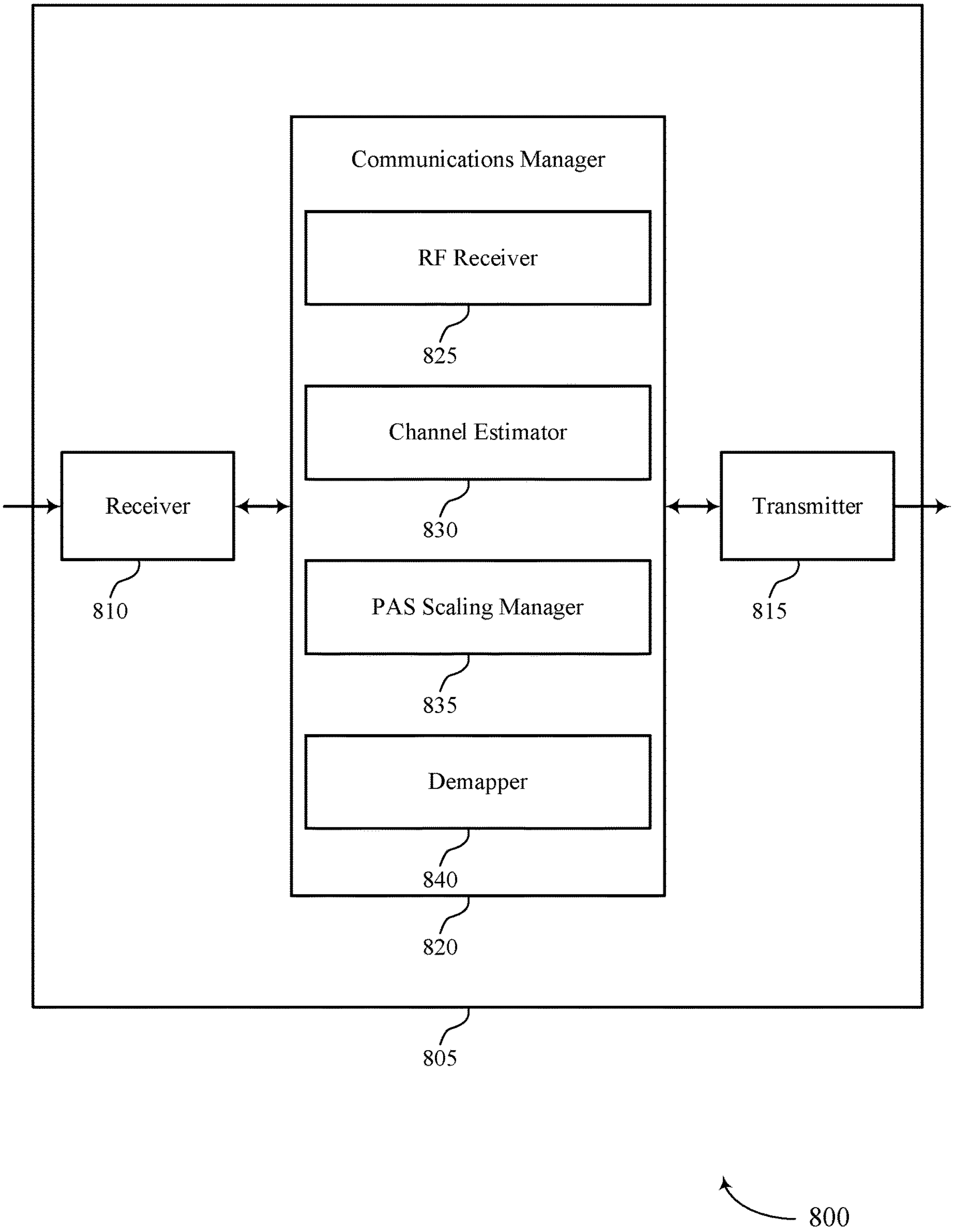

FIG. 8 shows a block diagram 800 of a device 805 that supports demodulation of modulation constellations with probabilistic amplitude shaping in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to demodulation of modulation constellations with probabilistic amplitude shaping). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to demodulation of modulation constellations with probabilistic amplitude shaping). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of demodulation of modulation constellations with probabilistic amplitude shaping as described herein. For example, the communications manager 820 may include an RF receiver 825, a channel estimator 830, a PAS scaling manager 835, a demapper 840, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. The RF receiver 825 may be configured as or otherwise support a means for receiving an input signal from a transmitter on a wireless resource. The channel estimator 830 may be configured as or otherwise support a means for estimating a channel noise between the UE and the transmitter associated with the wireless resource to determine a channel noise estimate. The PAS scaling manager 835 may be configured as or otherwise support a means for scaling the input signal and the channel noise estimate to generate a scaled input signal and a scaled channel noise estimate, where the scaling is based on a probability distribution parameter that is associated with a probabilistic amplitude shaping that is applied at the transmitter to a modulation constellation of the input signal. The demapper 840 may be configured as or otherwise support a means for demapping the modulation constellation of the input signal based on the scaled input signal and the scaled channel noise estimate.

Figure 9:
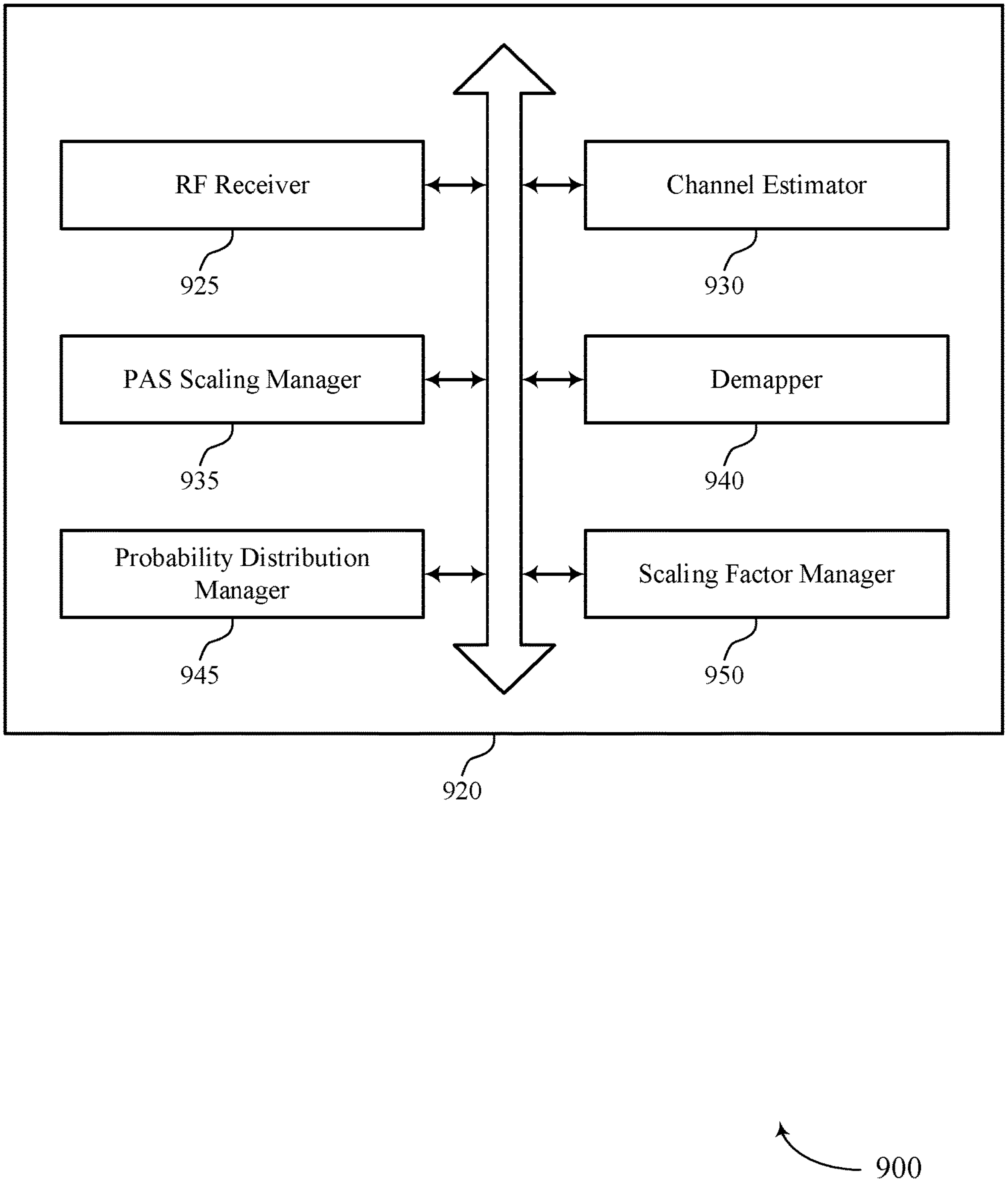
FIG. 9 shows a block diagram of a communications manager that supports demodulation of modulation constellations with probabilistic amplitude shaping in accordance with aspects of the present disclosure.

FIG. 9 shows a block diagram 900 of a communications manager 920 that supports demodulation of modulation constellations with probabilistic amplitude shaping in accordance with aspects of the present disclosure. The communications manager 920 may be an example of aspects of a communications manager 720, a communications manager 820, or both, as described herein. The communications manager 920, or various components thereof, may be an example of means for performing various aspects of demodulation of modulation constellations with probabilistic amplitude shaping as described herein. For example, the communications manager 920 may include an RF receiver 925, a channel estimator 930, a PAS scaling manager 935, a demapper 940, a probability distribution manager 945, a scaling factor manager 950, or any combination thereof. Each of these components may communicate, directly or indirectly, with one another (e.g., via one or more buses).

The communications manager 920 may support wireless communication at a UE in accordance with examples as disclosed herein. The RF receiver 925 may be configured as or otherwise support a means for receiving an input signal from a transmitter on a wireless resource. The channel estimator 930 may be configured as or otherwise support a means for estimating a channel noise between the UE and the transmitter associated with the wireless resource to determine a channel noise estimate. The PAS scaling manager 935 may be configured as or otherwise support a means for scaling the input signal and the channel noise estimate to generate a scaled input signal and a scaled channel noise estimate, where the scaling is based on a probability distribution parameter that is associated with a probabilistic amplitude shaping that is applied at the transmitter to a modulation constellation of the input signal. The demapper 940 may be configured as or otherwise support a means for demapping the modulation constellation of the input signal based on the scaled input signal and the scaled channel noise estimate.

In some examples, to support scaling, the probability distribution manager 945 may be configured as or otherwise support a means for identifying a probability distribution indicator that is associated with a probability distribution of the modulation constellation of the input signal. In some examples, to support scaling, the scaling factor manager 950 may be configured as or otherwise support a means for determining a scaling factor for the input signal and the channel noise estimate based on the probability distribution indicator. In some examples, to support scaling, the PAS scaling manager 935 may be configured as or otherwise support a means for scaling the input signal and the channel noise estimate based on the scaling factor.

In some examples, the scaling factor is a normalized value that is based on the probability distribution indicator and applied to each of the input signal and the channel noise estimate, and the scaled input signal and the scaled channel noise estimate are provided as inputs to a demapper. In some examples, the demapper is a maximum logarithm (Max-Log) detector that provides a log likelihood ratio (LLR) output to a decoder, and is a same demapper as used for a non-probabilistic amplitude shaped modulation constellation. In some examples, the scaling is based on a probability distribution indicator that provides an estimated divergence between a target distribution and an approximated distribution of the input signal, where the estimated divergence is less than a threshold value. In some examples, the probability distribution indicator is calculated at the UE as a parameter that provides a minimum Kullback-Leibler divergence between an approximated Maxwell-Boltzmann distribution of the input signal and the target distribution.

In some examples, the scaling is based on a probability distribution indicator that is provided by the transmitter. In some examples, the probability distribution indicator is received in a MAC-CE, in a DCI communication from the transmitter, in RRC signaling, or any combinations thereof. In some examples, the modulation constellation is a uniform QAM constellation with a non-equal probability of constellation symbol locations. In some examples, the modulation constellation is a uniform QAM constellation with an equal probability of constellation symbol locations.

Figure 10:
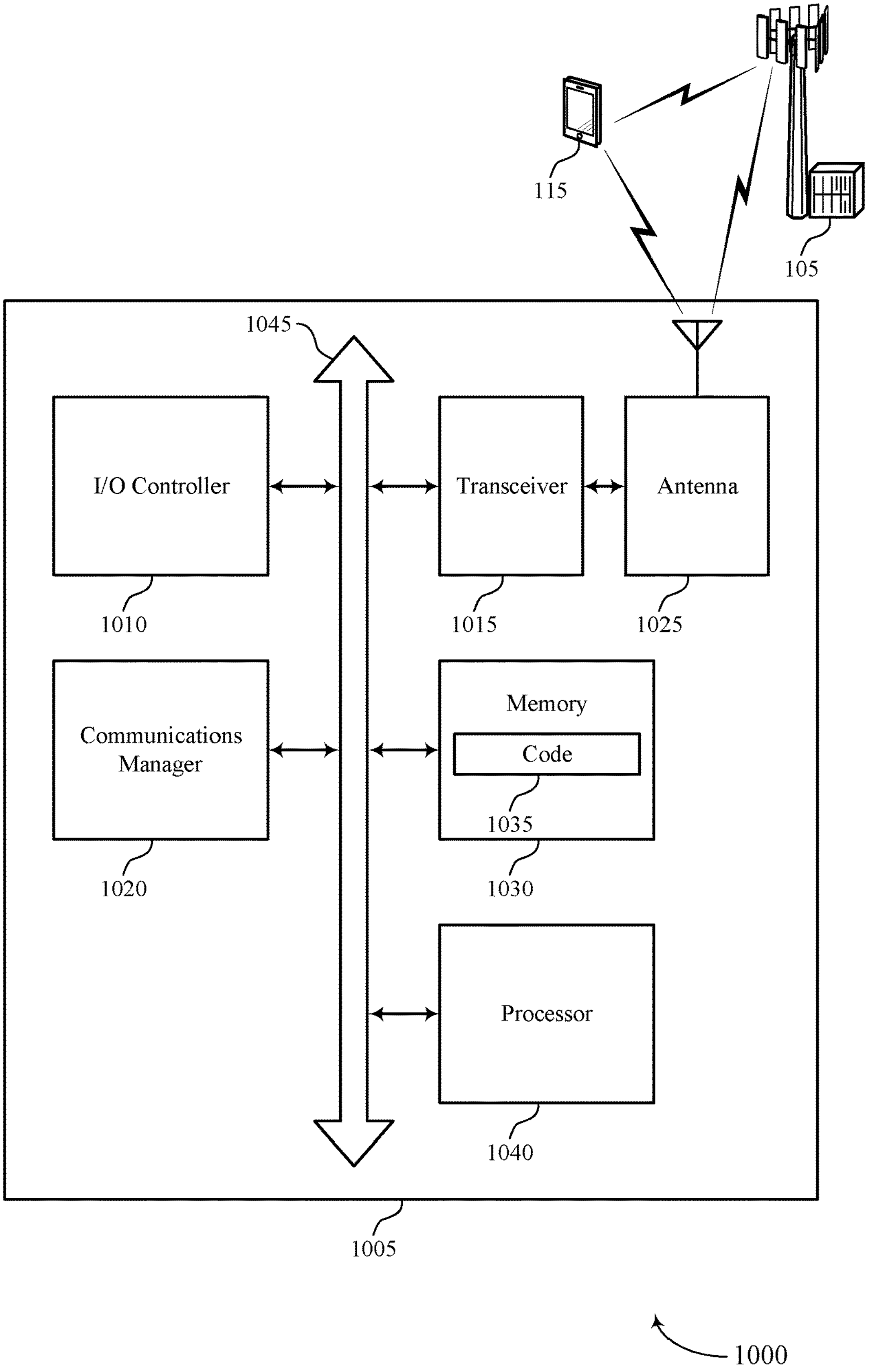
FIG. 10 shows a diagram of a system including a device that supports demodulation of modulation constellations with probabilistic amplitude shaping in accordance with aspects of the present disclosure.

FIG. 10 shows a diagram of a system 1000 including a device 1005 that supports demodulation of modulation constellations with probabilistic amplitude shaping in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting demodulation of modulation constellations with probabilistic amplitude shaping). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at a UE in accordance with examples as disclosed herein. For example, the communications manager 1020 may be configured as or otherwise support a means for receiving an input signal from a transmitter on a wireless resource. The communications manager 1020 may be configured as or otherwise support a means for estimating a channel noise between the UE and the transmitter associated with the wireless resource to determine a channel noise estimate. The communications manager 1020 may be configured as or otherwise support a means for scaling the input signal and the channel noise estimate to generate a scaled input signal and a scaled channel noise estimate, where the scaling is based on a probability distribution parameter that is associated with a probabilistic amplitude shaping that is applied at the transmitter to a modulation constellation of the input signal. The communications manager 1020 may be configured as or otherwise support a means for demapping the modulation constellation of the input signal based on the scaled input signal and the scaled channel noise estimate.

By including or configuring the communications manager 1020 in accordance with examples as described herein, the device 1005 may support techniques for demodulation of PAS modulation constellations that provide improvements to power consumption, spectral efficiency, higher data rates and, more efficient utilization of communication resources.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of demodulation of modulation constellations with probabilistic amplitude shaping as described herein, or the processor 1040 and the memory 1030 may be otherwise configured to perform or support such operations.

Figure 11:
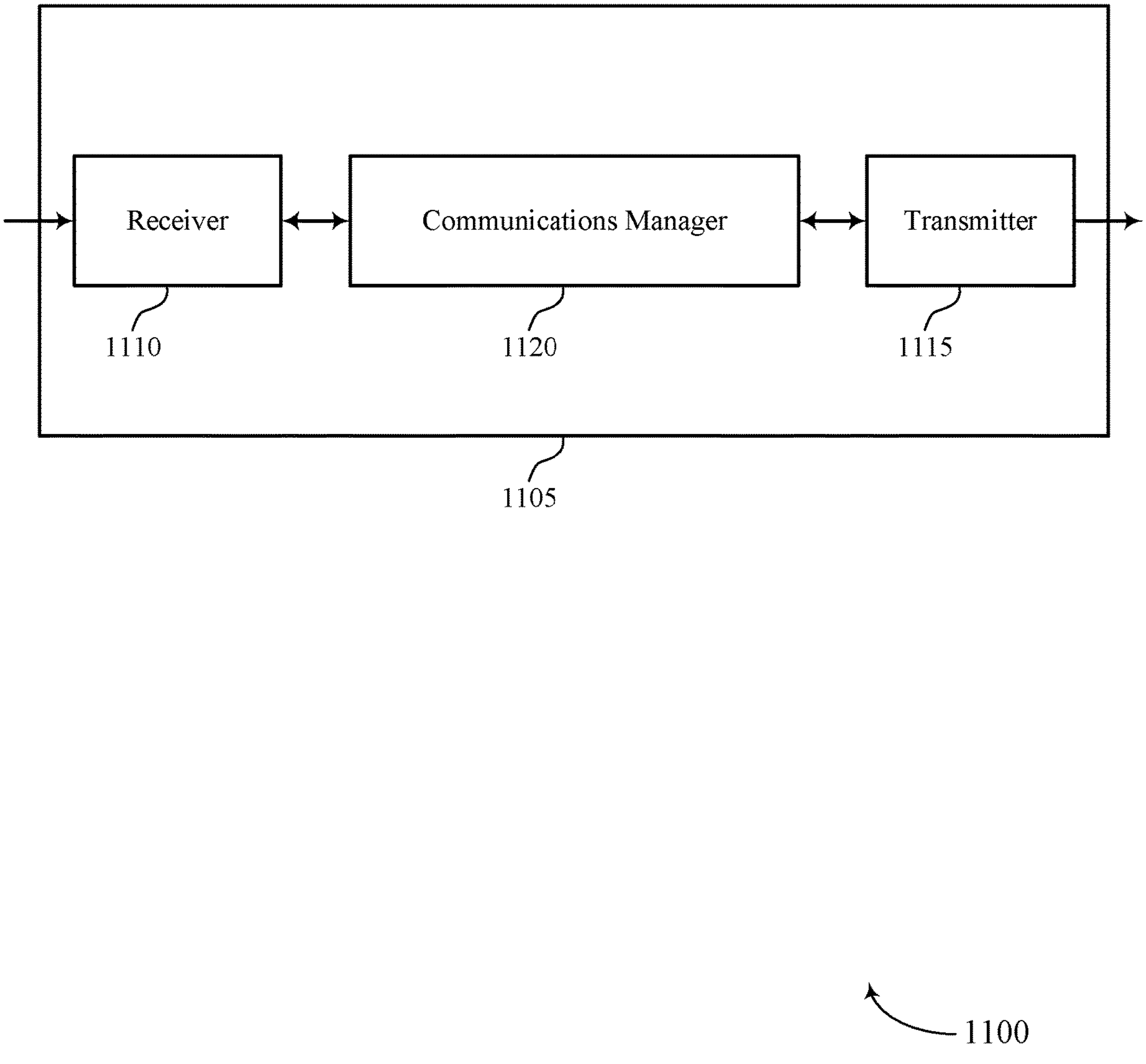
FIGS. 11 and 12 show block diagrams of devices that support demodulation of modulation constellations with probabilistic amplitude shaping in accordance with aspects of the present disclosure.

FIG. 11 shows a block diagram 1100 of a device 1105 that supports demodulation of modulation constellations with probabilistic amplitude shaping in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to demodulation of modulation constellations with probabilistic amplitude shaping). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to demodulation of modulation constellations with probabilistic amplitude shaping). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of demodulation of modulation constellations with probabilistic amplitude shaping as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. For example, the communications manager 1120 may be configured as or otherwise support a means for determining a probabilistic amplitude shaping for a modulation constellation of a signal to be transmitted to a UE. The communications manager 1120 may be configured as or otherwise support a means for transmitting, to the UE, a probability distribution indicator that is associated with the probabilistic amplitude shaping. The communications manager 1120 may be configured as or otherwise support a means for modulating the signal to be transmitted to the UE using the probabilistic amplitude shaping to generate a shaped modulation constellation. The communications manager 1120 may be configured as or otherwise support a means for transmitting the shaped modulation constellation to the UE.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for demodulation of PAS modulation constellations that provide improvements to power consumption, spectral efficiency, higher data rates and, more efficient utilization of communication resources.

Figure 12:
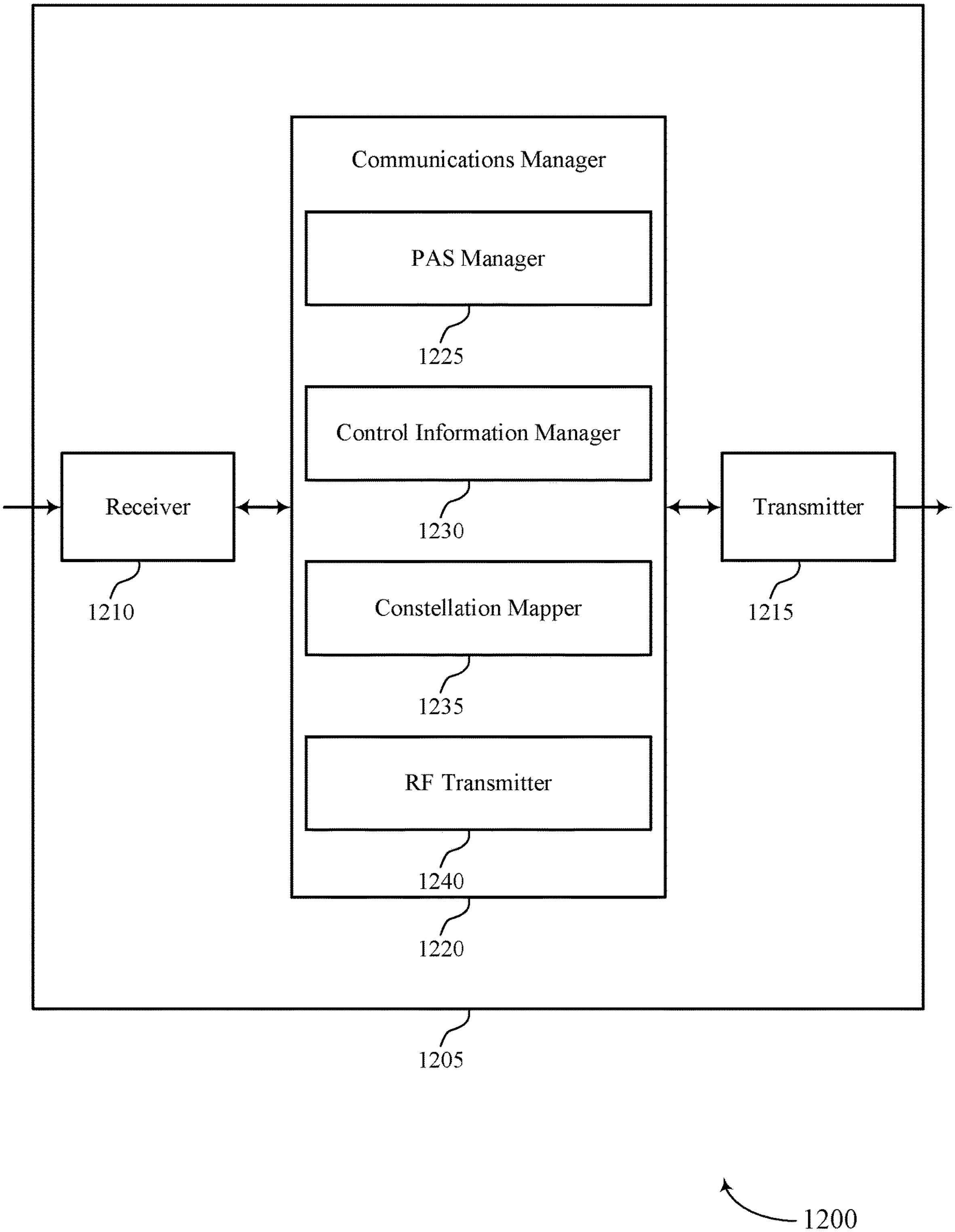

FIG. 12 shows a block diagram 1200 of a device 1205 that supports demodulation of modulation constellations with probabilistic amplitude shaping in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to demodulation of modulation constellations with probabilistic amplitude shaping). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to demodulation of modulation constellations with probabilistic amplitude shaping). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of demodulation of modulation constellations with probabilistic amplitude shaping as described herein. For example, the communications manager 1220 may include a PAS manager 1225, a control information manager 1230, a constellation mapper 1235, an RF transmitter 1240, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a base station in accordance with examples as disclosed herein. The PAS manager 1225 may be configured as or otherwise support a means for determining a probabilistic amplitude shaping for a modulation constellation of a signal to be transmitted to a UE. The control information manager 1230 may be configured as or otherwise support a means for transmitting, to the UE, a probability distribution indicator that is associated with the probabilistic amplitude shaping. The constellation mapper 1235 may be configured as or otherwise support a means for modulating the signal to be transmitted to the UE using the probabilistic amplitude shaping to generate a shaped modulation constellation. The RF transmitter 1240 may be configured as or otherwise support a means for transmitting the shaped modulation constellation to the UE.

Figure 13:
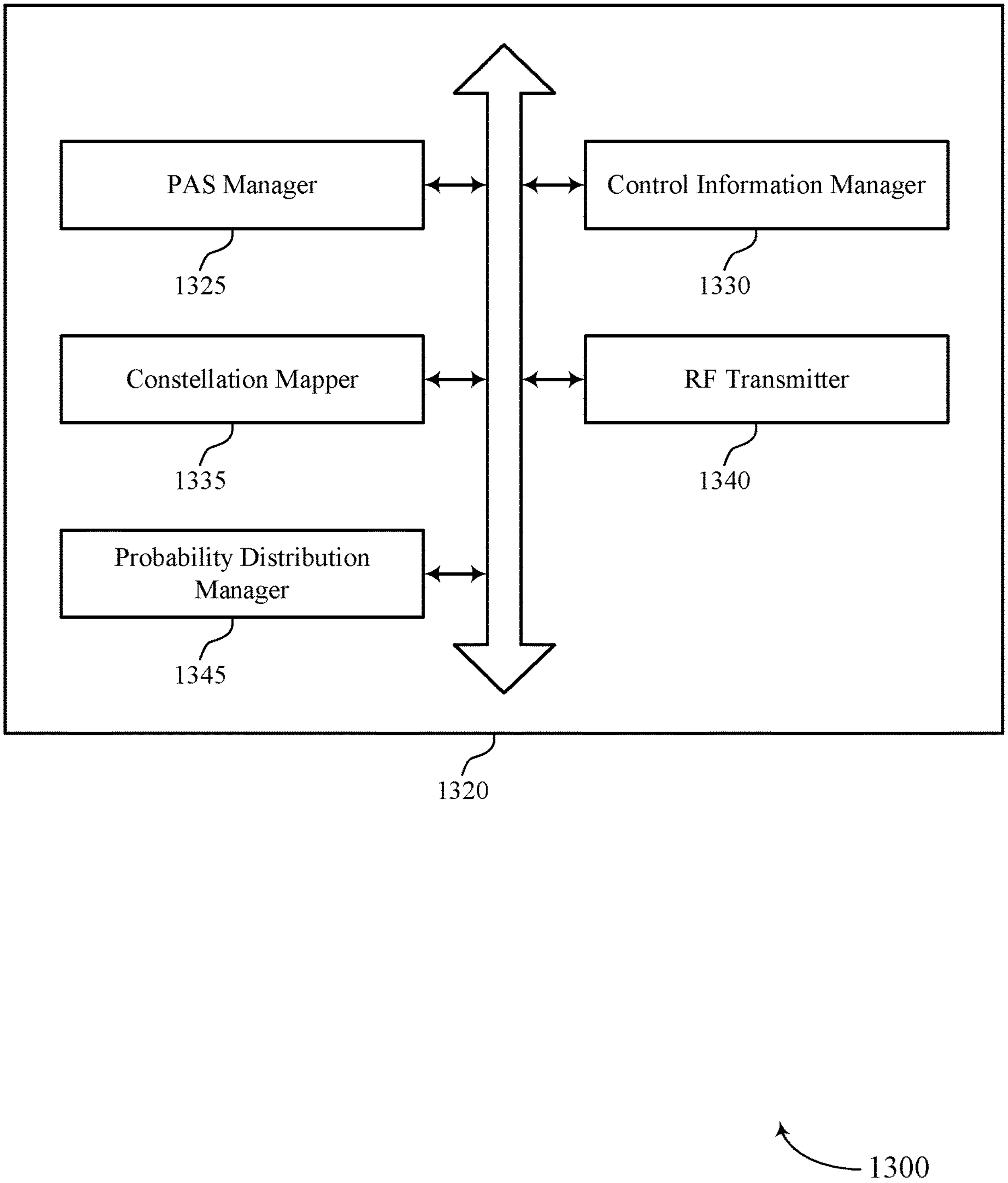
FIG. 13 shows a block diagram of a communications manager that supports demodulation of modulation constellations with probabilistic amplitude shaping in accordance with aspects of the present disclosure.

FIG. 13 shows a block diagram 1300 of a communications manager 1320 that supports demodulation of modulation constellations with probabilistic amplitude shaping in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of demodulation of modulation constellations with probabilistic amplitude shaping as described herein. For example, the communications manager 1320 may include a PAS manager

1325, a control information manager 1330, a constellation mapper 1335, an RF transmitter 1340, a probability distribution manager 1345, or any combination thereof. Each of these components may communicate, directly or indirectly, with one another (e.g., via one or more buses).

The communications manager 1320 may support wireless communication at a base station in accordance with examples as disclosed herein. The PAS manager 1325 may be configured as or otherwise support a means for determining a probabilistic amplitude shaping for a modulation constellation of a signal to be transmitted to a UE. The control information manager 1330 may be configured as or otherwise support a means for transmitting, to the UE, a probability distribution indicator that is associated with the probabilistic amplitude shaping. The constellation mapper 1335 may be configured as or otherwise support a means for modulating the signal to be transmitted to the UE using the probabilistic amplitude shaping to generate a shaped modulation constellation. The RF transmitter 1340 may be configured as or otherwise support a means for transmitting the shaped modulation constellation to the UE.

In some examples, the probability distribution indicator provides an estimated divergence between a target distribution and an approximated distribution of the shaped modulation constellation. In some examples, the probability distribution indicator is calculated as a parameter that provides a minimum Kullback-Leibler divergence between an approximated Maxwell-Boltzmann distribution of the shaped modulation constellation and the target distribution.

In some examples, the probability distribution indicator is transmitted in a MAC-CE, in a DCI communication to the UE, in RRC signaling, or any combinations thereof. In some examples, the shaped modulation constellation is a uniform QAM constellation with a non-equal probability of constellation symbol locations. In some examples, the shaped modulation constellation is a uniform QAM constellation with an equal probability of constellation symbol locations.

Figure 14:
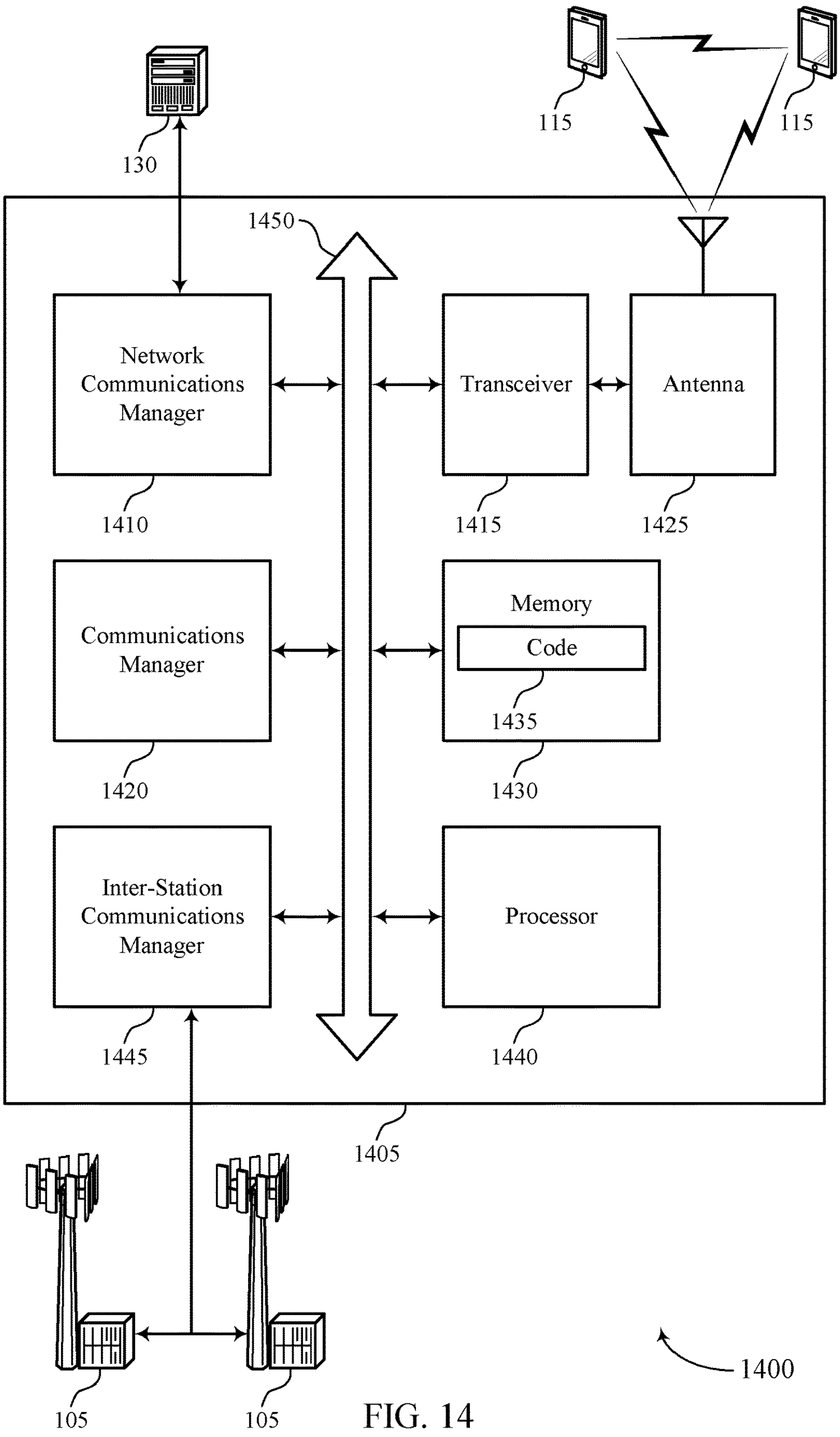
FIG. 14 shows a diagram of a system including a device that supports demodulation of modulation constellations with probabilistic amplitude shaping in accordance with aspects of the present disclosure.

FIG. 14 shows a diagram of a system 1400 including a device 1405 that supports demodulation of modulation constellations with probabilistic amplitude shaping in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting demodulation of modulation constellations with probabilistic amplitude shaping). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communication at a base station in accordance with examples as disclosed herein. For example, the communications manager 1420 may be configured as or otherwise support a means for determining a probabilistic amplitude shaping for a modulation constellation of a signal to be transmitted to a UE. The communications manager 1420 may be configured as or otherwise support a means for transmitting, to the UE, a probability distribution indicator that is associated with the probabilistic amplitude shaping.

The communications manager 1420 may be configured as or otherwise support a means for modulating the signal to be transmitted to the UE using the probabilistic amplitude shaping to generate a shaped modulation constellation. The communications manager 1420 may be configured as or otherwise support a means for transmitting the shaped modulation constellation to the UE.

By including or configuring the communications manager 1420 in accordance with examples as described herein, the device 1405 may support techniques for demodulation of PAS modulation constellations that provide improvements to power consumption, spectral efficiency, higher data rates and, more efficient utilization of communication resources.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of demodulation of modulation constellations with probabilistic amplitude shaping as described herein, or the processor 1440 and the memory 1430 may be otherwise configured to perform or support such operations.

Figure 15:
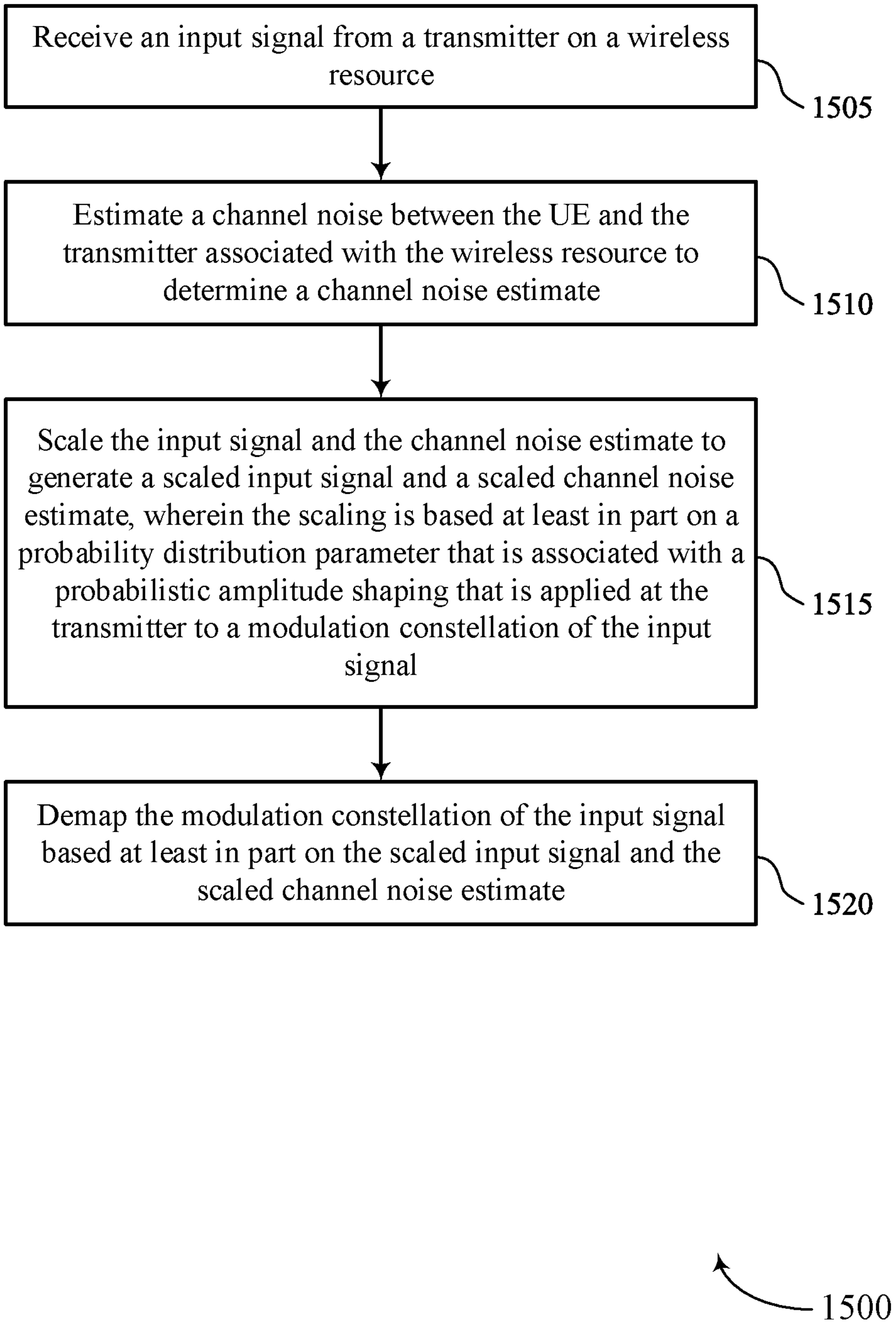
FIGS. 15 through 17 show flowcharts illustrating methods that support demodulation of modulation constellations with probabilistic amplitude shaping in accordance with aspects of the present disclosure.

FIG. 15 shows a flowchart illustrating a method 1500 that supports demodulation of modulation constellations with probabilistic amplitude shaping in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include receiving an input signal from a transmitter on a wireless resource. The operations of 1505 may be performed in accordance with examples as disclosed herein. In some examples, aspects of the operations of 1505 may be performed by an RF receiver 925 as described with reference to FIG. 9.

At 1510, the method may include estimating a channel noise between the UE and the transmitter associated with the wireless resource to determine a channel noise estimate. The operations of 1510 may be performed in accordance with examples as disclosed herein. In some examples, aspects of the operations of 1510 may be performed by a channel estimator 930 as described with reference to FIG. 9.

At 1515, the method may include scaling the input signal and the channel noise estimate to generate a scaled input signal and a scaled channel noise estimate, where the scaling is based on a probability distribution parameter that is associated with a probabilistic amplitude shaping that is applied at the transmitter to a modulation constellation of the input signal. The operations of 1515 may be performed in accordance with examples as disclosed herein. In some examples, aspects of the operations of 1515 may be performed by a PAS scaling manager 935 as described with reference to FIG. 9.

At 1520, the method may include demapping the modulation constellation of the input signal based on the scaled input signal and the scaled channel noise estimate. The operations of 1520 may be performed in accordance with examples as disclosed herein. In some examples, aspects of the operations of 1520 may be performed by a demapper 940 as described with reference to FIG. 9.

Figure 16:
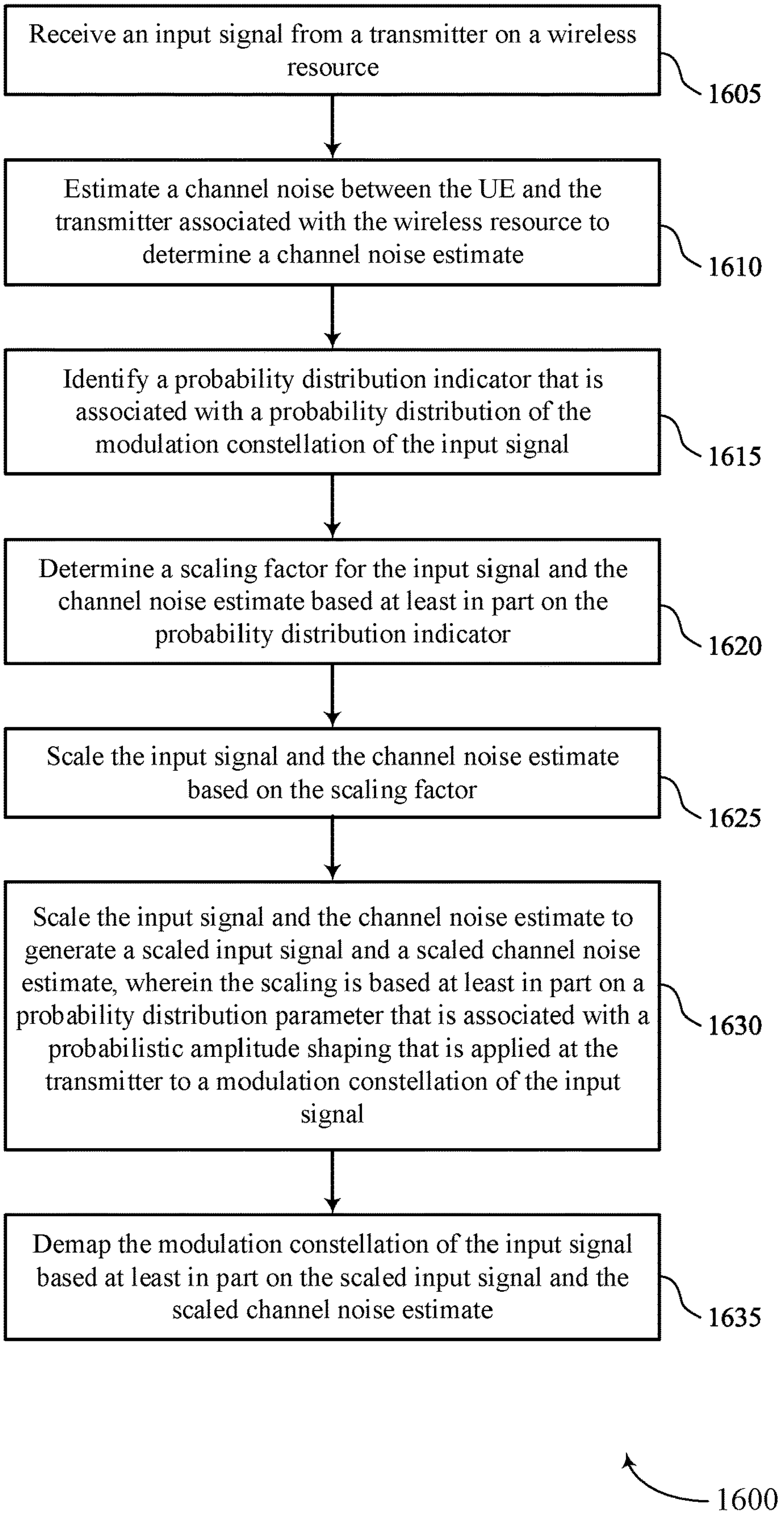

FIG. 16 shows a flowchart illustrating a method 1600 that supports demodulation of modulation constellations with probabilistic amplitude shaping in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include receiving an input signal from a transmitter on a wireless resource. The operations of 1605 may be performed in accordance with examples as disclosed herein. In some examples, aspects of the operations of 1605 may be performed by an RF receiver 925 as described with reference to FIG. 9.

At 1610, the method may include estimating a channel noise between the UE and the transmitter associated with the wireless resource to determine a channel noise estimate. The operations of 1610 may be performed in accordance with examples as disclosed herein. In some examples, aspects of the operations of 1610 may be performed by a channel estimator 930 as described with reference to FIG. 9.

At 1615, the method may include identifying a probability distribution indicator that is associated with a probability distribution of the modulation constellation of the input signal. The operations of 1615 may be performed in accordance with examples as disclosed herein. In some examples, aspects of the operations of 1615 may be performed by a probability distribution manager 945 as described with reference to FIG. 9.

At 1620, the method may include determining a scaling factor for the input signal and the channel noise estimate based on the probability distribution indicator. The operations of 1620 may be performed in accordance with examples as disclosed herein. In some examples, aspects of the operations of 1620 may be performed by a scaling factor manager 950 as described with reference to FIG. 9.

At 1625, the method may include scaling the input signal and the channel noise estimate based on the scaling factor. The operations of 1625 may be performed in accordance with examples as disclosed herein. In some examples, aspects of the operations of 1625 may be performed by a PAS scaling manager 935 as described with reference to FIG. 9. In some cases, the scaling factor is a normalized value that is based on the probability distribution indicator and applied to each of the input signal and the channel noise estimate, and the scaled input signal and the scaled channel noise estimate are provided as inputs to a demapper. In some cases, the demapper is a Max-Log detector that provides a LLR output to a decoder, and is a same demapper as used for a non-probabilistic amplitude shaped modulation constellation.

At 1630, the method may include scaling the input signal and the channel noise estimate to generate a scaled input signal and a scaled channel noise estimate, where the scaling is based on a probability distribution parameter that is associated with a probabilistic amplitude shaping that is applied at the transmitter to a modulation constellation of the input signal. The operations of 1630 may be performed in accordance with examples as disclosed herein. In some examples, aspects of the operations of 1630 may be performed by a PAS scaling manager 935 as described with reference to FIG. 9.

At 1635, the method may include demapping the modulation constellation of the input signal based on the scaled input signal and the scaled channel noise estimate. The operations of 1635 may be performed in accordance with examples as disclosed herein. In some examples, aspects of the operations of 1635 may be performed by a demapper 940 as described with reference to FIG. 9.

Figure 17:
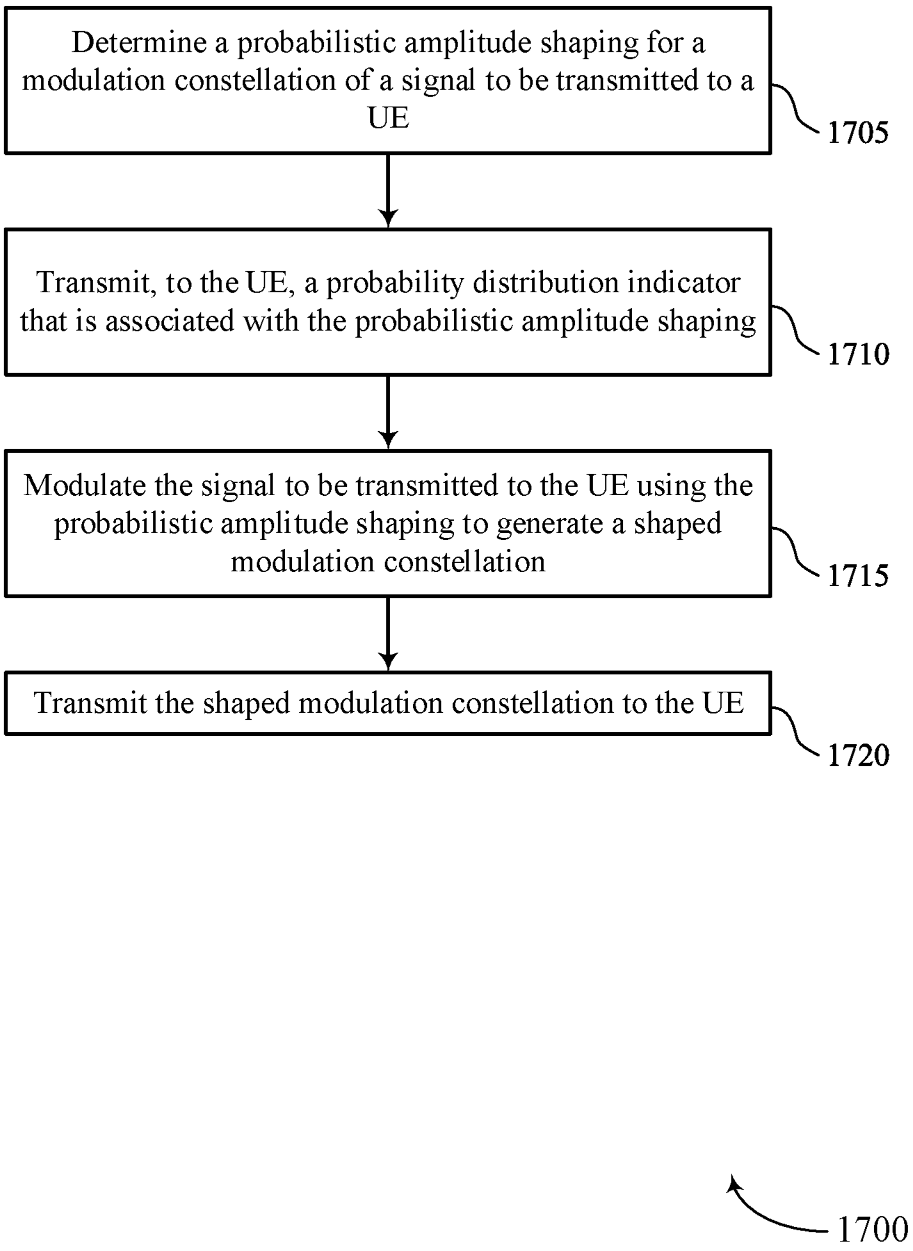

FIG. 17 shows a flowchart illustrating a method 1700 that supports demodulation of modulation constellations with probabilistic amplitude shaping in accordance with aspects of the present disclosure. The operations of the method 1700 may be implemented by a base station or its components as described herein. For example, the operations of the method 1700 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1705, the method may include determining a probabilistic amplitude shaping for a modulation constellation of a signal to be transmitted to a UE. The operations of 1705 may be performed in accordance with examples as disclosed herein. In some examples, aspects of the operations of 1705 may be performed by a PAS manager 1325 as described with reference to FIG. 13.

At 1710, the method may include transmitting, to the UE, a probability distribution indicator that is associated with the probabilistic amplitude shaping. The operations of 1710 may be performed in accordance with examples as disclosed herein. In some examples, aspects of the operations of 1710 may be performed by a control information manager 1330 as described with reference to FIG. 13.

At 1715, the method may include modulating the signal to be transmitted to the UE using the probabilistic amplitude shaping to generate a shaped modulation constellation. The operations of 1715 may be performed in accordance with examples as disclosed herein. In some examples, aspects of the operations of 1715 may be performed by a constellation mapper 1335 as described with reference to FIG. 13.

At 1720, the method may include transmitting the shaped modulation constellation to the UE. The operations of 1720 may be performed in accordance with examples as disclosed herein. In some examples, aspects of the operations of 1720 may be performed by an RF transmitter 1340 as described with reference to FIG. 13.

The following provides an overview of aspects of the present disclosure:

Aspect 1: A method for wireless communication at a UE, comprising: receiving an input signal from a transmitter on a wireless resource; estimating a channel noise between the UE and the transmitter associated with the wireless resource to determine a channel noise estimate; scaling the input signal and the channel noise estimate to generate a scaled input signal and a scaled channel noise estimate, wherein the scaling is based at least in part on a probability distribution parameter that is associated with a probabilistic amplitude shaping that is applied at the transmitter to a modulation constellation of the input signal; and demapping the modulation constellation of the input signal based at least in part on the scaled input signal and the scaled channel noise estimate.

Aspect 2: The method of aspect 1, wherein the scaling comprises: identifying a probability distribution indicator that is associated with a probability distribution of the modulation constellation of the input signal; and determining a scaling factor for the input signal and the channel noise estimate based at least in part on the probability distribution indicator; and scaling the input signal and the channel noise estimate based on the scaling factor.

Aspect 3: The method of aspect 2, wherein the scaling factor is a normalized value that is based on the probability distribution indicator and applied to each of the input signal and the channel noise estimate, and the scaled input signal and the scaled channel noise estimate are provided as inputs to a demapper.

Aspect 4: The method of aspect 3, wherein the demapper is a maximum logarithm (Max-Log) detector that provides a log likelihood ratio (LLR) output to a decoder, and is a same demapper as used for a non-probabilistic amplitude shaped modulation constellation.

Aspect 5: The method of any of aspects 1 through 4, wherein the scaling is based at least in part on a probability distribution indicator that provides an estimated divergence between a target distribution and an approximated distribution of the input signal, wherein the estimated divergence is less than a threshold value.

Aspect 6: The method of aspect 5, wherein the probability distribution indicator is calculated at the UE as a parameter that provides a minimum Kullback-Leibler divergence between an approximated Maxwell-Boltzmann distribution of the input signal and the target distribution.

Aspect 7: The method of any of aspects 1 through 6, wherein the scaling is based at least in part on a probability distribution indicator that is provided by the transmitter.

Aspect 8: The method of aspect 7, wherein the probability distribution indicator is received in a medium access control (MAC) control element, in a DCI communication from the transmitter, in RRC signaling, or any combinations thereof.

Aspect 9: The method of any of aspects 1 through 8, wherein the modulation constellation is a uniform quadrature amplitude modulation (QAM) constellation with a non-equal probability of constellation symbol locations.

Aspect 10: The method of any of aspects 1 through 8, wherein the modulation constellation is a uniform quadrature amplitude modulation (QAM) constellation with an equal probability of constellation symbol locations.

Aspect 11: A method for wireless communication at a base station, comprising: determining a probabilistic amplitude shaping for a modulation constellation of a signal to be transmitted to a UE; transmitting, to the UE, a probability distribution indicator that is associated with the probabilistic amplitude shaping; modulating the signal to be transmitted to the UE using the probabilistic amplitude shaping to generate a shaped modulation constellation; and transmitting the shaped modulation constellation to the UE.

Aspect 12: The method of aspect 11, wherein the probability distribution indicator provides an estimated divergence between a target distribution and an approximated distribution of the shaped modulation constellation.

Aspect 13: The method of aspect 12, wherein the probability distribution indicator is calculated as a parameter that provides a minimum Kullback-Leibler divergence between an approximated Maxwell-Boltzmann distribution of the shaped modulation constellation and the target distribution.

Aspect 14: The method of any of aspects 11 through 13, wherein the probability distribution indicator is transmitted in a medium access control (MAC) control element, in a DCI communication to the UE, in RRC signaling, or any combinations thereof.

Aspect 15: The method of any of aspects 11 through 14, wherein the shaped modulation constellation is a uniform quadrature amplitude modulation (QAM) constellation with a non-equal probability of constellation symbol locations.

Aspect 16: The method of any of aspects 11 through 14, wherein the shaped modulation constellation is a uniform quadrature amplitude modulation (QAM) constellation with an equal probability of constellation symbol locations.

Aspect 17: An apparatus for wireless communication at a UE, comprising a processor; memory coupled with the processor; and instructions stored in the memory and executable by the processor to cause the apparatus to perform a method of any of aspects 1 through 10.

Aspect 18: An apparatus for wireless communication at a UE, comprising at least one means for performing a method of any of aspects 1 through 10.

Aspect 19: A non-transitory computer-readable medium storing code for wireless communication at a UE, the code comprising instructions executable by a processor to perform a method of any of aspects 1 through 10.

Aspect 20: An apparatus for wireless communication at a base station, comprising a processor; memory coupled with the processor; and instructions stored in the memory and executable by the processor to cause the apparatus to perform a method of any of aspects 11 through 16.

Aspect 21: An apparatus for wireless communication at a base station, comprising at least one means for performing a method of any of aspects 11 through 16.

Aspect 22: A non-transitory computer-readable medium storing code for wireless communication at a base station, the code comprising instructions executable by a processor to perform a method of any of aspects 11 through 16.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:

receiving an input signal from a transmitter on a wireless resource;

estimating a channel noise between the UE and the transmitter associated with the wireless resource to determine a channel noise estimate;

scaling the input signal and the channel noise estimate to generate a scaled input signal and a scaled channel noise estimate, wherein the scaling is based at least in part on a probability distribution parameter that is associated with a probabilistic amplitude shaping that is applied at the transmitter to a modulation constellation of the input signal; and demapping the modulation constellation of the input signal based at least in part on the scaled input signal and the scaled channel noise estimate.

2. The method of claim 1, wherein the scaling comprises:

identifying a probability distribution indicator that is associated with a probability distribution of the modulation constellation of the input signal;

determining a scaling factor for the input signal and the channel noise estimate based at least in part on the probability distribution indicator; and scaling the input signal and the channel noise estimate based on the scaling factor.

3. The method of claim 2, wherein the scaling factor is a normalized value that is based on the probability distribution indicator and applied to each of the input signal and the channel noise estimate, and the scaled input signal and the scaled channel noise estimate are provided as inputs to a demapper.

4. The method of claim 3, wherein the demapper is a maximum logarithm (Max-Log) detector that provides a log likelihood ratio (LLR) output to a decoder, and is a same demapper as used for a non-probabilistic amplitude shaped modulation constellation.

5. The method of claim 1, wherein the scaling is based at least in part on a probability distribution indicator that provides an estimated divergence between a target distribution and an approximated distribution of the input signal, wherein the estimated divergence is less than a threshold value.

6. The method of claim 5, wherein the probability distribution indicator is calculated at the UE as a parameter that provides a minimum Kullback-Leibler divergence between an approximated Maxwell-Boltzmann distribution of the input signal and the target distribution.

7. The method of claim 1, wherein the scaling is based at least in part on a probability distribution indicator that is provided by the transmitter.

8. The method of claim 7, wherein the probability distribution indicator is received in a medium access control (MAC) control element, in a downlink control information (DCI) communication from the transmitter, in radio resource control (RRC) signaling, or any combinations thereof.

9. The method of claim 1, wherein the modulation constellation is a uniform quadrature amplitude modulation (QAM) constellation with a non-equal probability of constellation symbol locations.

10. The method of claim 1, wherein the modulation constellation is a uniform quadrature amplitude modulation (QAM) constellation with an equal probability of constellation symbol locations.

11. A method for wireless communication at a network entity, comprising:

determining a probabilistic amplitude shaping for a modulation constellation of a signal to be transmitted to a user equipment (UE);

transmitting, to the UE, a probability distribution indicator that is associated with the probabilistic amplitude shaping;

modulating the signal to be transmitted to the UE using the probabilistic amplitude shaping to generate a shaped modulation constellation; and transmitting the shaped modulation constellation to the UE.

12. The method of claim 11, wherein the probability distribution indicator provides an estimated divergence between a target distribution and an approximated distribution of the shaped modulation constellation.

13. The method of claim 12, wherein the probability distribution indicator is calculated as a parameter that provides a minimum Kullback-Leibler divergence between an approximated Maxwell-Boltzmann distribution of the shaped modulation constellation and the target distribution.

14. The method of claim 11, wherein the probability distribution indicator is transmitted in a medium access control (MAC) control element, in a downlink control information (DCI) communication to the UE, in radio resource control (RRC) signaling, or any combinations thereof.

15. The method of claim 11, wherein the shaped modulation constellation is a uniform quadrature amplitude modulation (QAM) constellation with a non-equal probability of constellation symbol locations.

16. The method of claim 11, wherein the shaped modulation constellation is a uniform quadrature amplitude modulation (QAM) constellation with an equal probability of constellation symbol locations.

17. An apparatus for wireless communication at a user equipment (UE), comprising:

one or more processors;

memory coupled with the one or more processors; and instructions stored in the memory and executable by the one or more processors to cause the apparatus to:

receive an input signal from a transmitter on a wireless resource;

estimate a channel noise between the UE and the transmitter associated with the wireless resource to determine a channel noise estimate;

scale the input signal and the channel noise estimate to generate a scaled input signal and a scaled channel noise estimate, wherein the scaling is based at least in part on a probability distribution parameter that is associated with a probabilistic amplitude shaping that is applied at the transmitter to a modulation constellation of the input signal; and demap the modulation constellation of the input signal based at least in part on the scaled input signal and the scaled channel noise estimate.

18. The apparatus of claim 17, wherein the instructions to scale are executable by the one or more processors to cause the apparatus to:

identify a probability distribution indicator that is associated with a probability distribution of the modulation constellation of the input signal;

determine a scaling factor for the input signal and the channel noise estimate based at least in part on the probability distribution indicator; and scale the input signal and the channel noise estimate based on the scaling factor.

19. The apparatus of claim 18, wherein the scaling factor is a normalized value that is based on the probability distribution indicator and applied to each of the input signal and the channel noise estimate, and the scaled input signal and the scaled channel noise estimate are provided as inputs to a demapper.

20. The apparatus of claim 19, wherein the demapper is a maximum logarithm (Max-Log) detector that provides a log likelihood ratio (LLR) output to a decoder, and is a same demapper as used for a non-probabilistic amplitude shaped modulation constellation.

21. The apparatus of claim 17, wherein the scaling is based at least in part on a probability distribution indicator that provides an estimated divergence between a target distribution and an approximated distribution of the input signal, wherein the estimated divergence is less than a threshold value.

22. The apparatus of claim 21, wherein the probability distribution indicator is calculated at the UE as a parameter that provides a minimum Kullback-Leibler divergence between an approximated Maxwell-Boltzmann distribution of the input signal and the target distribution.

23. The apparatus of claim 17, wherein the scaling is based at least in part on a probability distribution indicator that is provided by the transmitter.

24. The apparatus of claim 23, wherein the probability distribution indicator is received in a medium access control (MAC) control element, in a downlink control information (DCI) communication from the transmitter, in radio resource control (RRC) signaling, or any combinations thereof.

25. The apparatus of claim 17, wherein the modulation constellation is a uniform or quadrature amplitude modulation (QAM) constellation with an equal or non-equal probability of constellation symbol locations.

26. An apparatus for wireless communication at a network entity, comprising:

one or more processors;

memory coupled with the one or more processors; and instructions stored in the memory and executable by the one or more processors to cause the apparatus to:

determine a probabilistic amplitude shaping for a modulation constellation of a signal to be transmitted to a user equipment (UE);

transmit, to the UE, a probability distribution indicator that is associated with the probabilistic amplitude shaping;

modulate the signal to be transmitted to the UE using the probabilistic amplitude shaping to generate a shaped modulation constellation; and transmit the shaped modulation constellation to the UE.

27. The apparatus of claim 26, wherein the probability distribution indicator provides an estimated divergence between a target distribution and an approximated distribution of the shaped modulation constellation.

28. The apparatus of claim 27, wherein the probability distribution indicator is calculated as a parameter that provides a minimum Kullback-Leibler divergence between an approximated Maxwell-Boltzmann distribution of the shaped modulation constellation and the target distribution.

29. The apparatus of claim 26, wherein the probability distribution indicator is transmitted in a medium access control (MAC) control element, in a downlink control information (DCI) communication to the UE, in radio resource control (RRC) signaling, or any combinations thereof.

30. The apparatus of claim 26, wherein the shaped modulation constellation is a uniform quadrature amplitude modulation (QAM) constellation with an equal or non-equal probability of constellation symbol locations.

* * * * *